United States Patent [19]

Bussard

[11] Patent Number: 4,826,646

[45] Date of Patent: May 2, 1989

[54] METHOD AND APPARATUS FOR CONTROLLING CHARGED PARTICLES

[75] Inventor: Robert W. Bussard, Chantilly, Va.

[73] Assignee: Energy/Matter Conversion Corporation, Inc., Chantilly, Va.

[21] Appl. No.: 792,660

[22] Filed: Oct. 29, 1985

[51] Int. Cl.$^4$ ............................................... G21B 1/02
[52] U.S. Cl. .................................... 376/129; 376/107; 376/127
[58] Field of Search ............... 376/107, 121, 127, 128, 376/129, 146, 147

[56] References Cited

U.S. PATENT DOCUMENTS

| | | | |
|---|---|---|---|
| 3,230,418 | 1/1966 | Dandl et al. | 376/128 |
| 3,258,402 | 6/1966 | Farnsworth | 376/107 |
| 3,386,883 | 6/1968 | Farnsworth | 376/107 |
| 3,527,977 | 9/1970 | Ruark | 376/127 |
| 3,530,036 | 9/1970 | Hirsch | 376/107 |
| 3,530,497 | 9/1970 | Hirsch et al. | 376/107 |
| 3,533,910 | 10/1970 | Hirsch | 376/107 |
| 3,655,508 | 4/1972 | Hirsch | 376/128 |
| 3,664,920 | 5/1972 | Hirsch . | |
| 4,007,392 | 2/1977 | Valfells et al. | 313/154 |
| 4,233,537 | 11/1980 | Limpaecher | 376/129 |
| 4,367,193 | 1/1983 | Bussard | 376/146 |
| 4,430,290 | 2/1984 | Kiryu | 376/107 |

OTHER PUBLICATIONS

Keller, et al., "Confinement d'un Plasma par un Systeme Polyedrique a Courant Alternatif", *Z. Naturforschg.*, vol. 21 n, pp. 1085-1089 (1966).
Elmore, et al., "On the Inertial-Electrostatic Confinement of a Plasma", *Physics of Fluids*, vol. 2, No. 33, pp. 239-246 (May-Jun. 1959).
Furth, "Prevalent Instability of Nonthermal Plasma", *Physics of Fluids*, vol. 6, No. 1, pp. 48-53 (Jan. 1963).
Hirsch, "Inertial-Electrostatic Confinement of Ionized Fusion Gases", *Journal of Applied Physics*, vol. 38, No. 11 (Oct. 1967), pp. 4522-4534.
Baxter, et al., "The Effect of Charge Exchange and Ionization in Electrostatic Confinement Devices", *Journal of Applied Physics*, vol. 53, No. 7, pp. 4597-4601 (Jul. 1982).
Blondin, et al., "Equilibrium Plasma Conditions in Electrostatically Plugged Cusps and Mirrors", *Journal of Applied Physics*, vol. 47, No. 7, pp. 2903-2906 (Jul. 1976).
Hinton, et al., "Stabilization of Axisymmetric Mirror Plasmas by Energetic Ion Injection", *Nuclear Fusion*, vol. 22, No. 12, pp. 1547-1557 (1982).
Catto, et al., "Electrostatic Enhancement of Mirror Confinement", *Nuclear Fusion*, vol. 24, No. 2, pp. 229-233 (1984).
Verdeyen, et al., "Recent Developments in Electrostatic Confinement—Experimental", *Annals of the New York Academy of Science*, vol. 251, pp. 126-138 (May 8, 1975).
Dolan, "Electric-magnetic Confinement", *Annals of the New York Academy of Science*, vol. 251, pp. 358-366 (May 8, 1975).
Stansfield, et al., "Progress Report on the Kemp II Experiment: Plasma Confinement in an Electrostatically Stoppered Spindle Cusp Magnetic Field", *Annals of the New York Academy of Science*, vol. 251, pp. 367-369 (May 8, 1975).
Lavrent'Ev, "Electrostatic and Electromagnetic High--Temperature Plasma Traps", *Annals of the New York Academy of Science*, vol. 251, pp. 152-178, (May 8, 1975).

*Primary Examiner*—Charles T. Jordan
*Assistant Examiner*—Richard L. Klein
*Attorney, Agent, or Firm*—Foley & Lardner Schwartz, Jeffery Schwaab, Mack Blumenthal & Evans

[57] ABSTRACT

An apparatus and method for controlling charged particles. The charged particles comprise electrons and positive ions. A magnetic field having only point cusps is used to confine injected electrons and so to generate a negative potential well. Positive ions injected into the negative potential well are trapped therein. The preferred means for generating the magnetic field is current-carrying elements arranged at positions corresponding to the edges of any of several truncated regular polyhedrons.

36 Claims, 9 Drawing Sheets

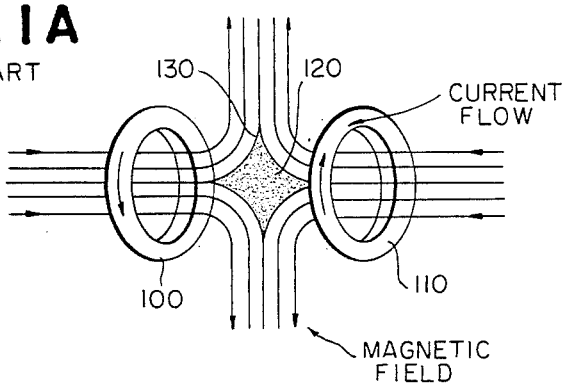
FIG. IA
PRIOR ART
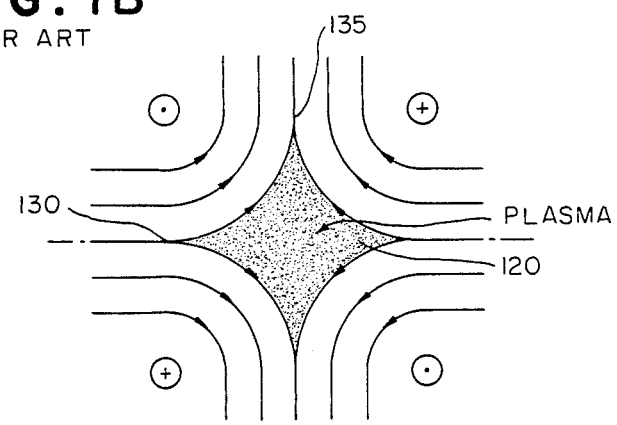
FIG. IB
PRIOR ART
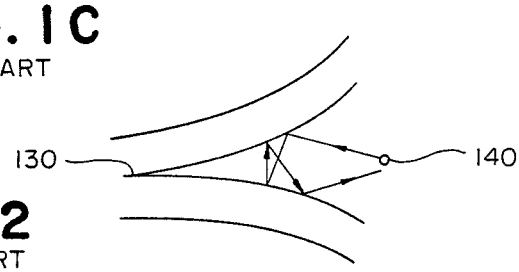
FIG. IC
PRIOR ART
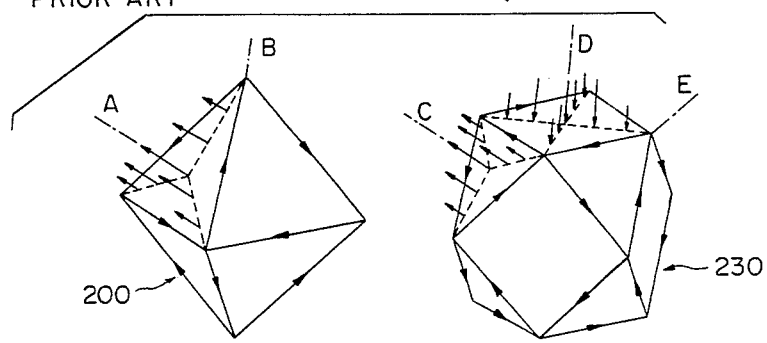
FIG. 2
PRIOR ART

ELECTRON CLOUD 330
310 GRID
300 ELECTRON EMITTING SURFACE 410
400

METHOD AND APPARATUS FOR CONTROLLING CHARGED PARTICLES

BACKGROUND OF THE INVENTION

The invention pertains to a method and apparatus for controlling charged particles, and more particularly to a method and apparatus for confining ionized gases or plasmas.

Confinement of dense ionized gases is a necessary step in several processes which are currently the object of intense research. These processes include nuclear fusion. Research on the confinement and heating of ionized gases and of their electron and ionic charged particle gaseous components has concentrated principally on the methods of inertial confinement and magnetic confinement.

An example of non-magnetic and non-electric inertial confinement is the so-called "laser-fusion" process in which large pressures are to be induced over the surface of small spheres of material which it is desired to heat and confine by the vaporization and "blowoff" of surface material by laser light energy heating thereof. Such high pressures cause the compression and resulting compressional heating of the material within the small spheres. The principal difficulty of achieving useful fusion-reaction-producing conditions by such hydrodynamic-inertial confinement means is that of the lack of stability of compression, to the very high densities required, of small amounts of material in spherical or other convergent geometries. In such inertial-compression schemes it is necessary to create the forces and drive the compression sufficiently rapidly that radiation and electron conduction energy loss processes from the compressing plasma/material do not radiate and/or carry away the material internal energy before the desired particle energy (i.e., temperature) has been achieved. Typically, time scales of fractions of microseconds are required for such systems.

Attainable compression temperatures are limited by deviations from perfect symmetry of compression which lead to non-spherical compressed geometries, mixing of material, and other effects. Because of these requirements and physical difficulties such inertial-mechanical means for confining and heating plasma material have been shown to require large power input to the devices and machinery used for studies of such processes. This approach is of little interest in connection with and has no fundamental relevance to the present invention, and will not be further considered.

In magnetic confinement methods, strong magnetic fields are used in various geometries in attempts to confine or hold plasmas in well-defined spatial regions for periods of time long enough to allow their heating to desired levels of plasma ion particle energy or temperature.

An example of a device which employs a magnetic confinement method is the tokamak. The tokamak has a toroidal magnetic confinement geometry in which plasma ions and electrons are to be held within a toroidal volume by the magnetic field lines which circle through that volume.

Another example of such a device is a mirror machine. A mirror machine uses a "mirror" geometry in which opposing (facing) magnet coils act to provide a high-field surface around a central volume at lower field strength. Use of similarly-directed currents in such end coils causes "end-plugging" of a solenoidal field configuration, while oppositely-directed currents give rise to a bi-conic mirror geometry around a region in which the central magnetic field strength can drop to zero. This latter arrangement is described in more detail below.

Charged particles (e.g., plasma ions and/or electrons) gyrate around (normal to) the magnetic field lines in all such systems, in orbits whose gyro radii are set by their individual particle charge, mass, and energy of motion transverse to the magnetic fields.

As just mentioned, one of the magnetic field geometries which have been studied for plasma confinement is the simple bi-conic mirror cusp geometry. Such a system is depicted in FIGS. 1A–1C. In this system two opposing coils 100 and 110 carrying oppositely-directed currents face ("mirror") each other and produce a bipolar and equatorial field "cusp" geometry. The advantage of this system is that it is (i.e., has been shown to be) inherently stable to macroscopic "collective" losses of plasma across the field. This is in contrast to the toroidal tokamak and to the solenoidal mirror geometries which are not inherently stable to such losses. Losses in the bi-conic mirror sytem are principally out through the polar end cusps one of which is labelled 130, and the belt or equatorial "ring" cusp 135 of the magnetic field geometry. Particles 140 making up plasma 120 approach point cusp 130 from a range of angles. Most are deflected due to their having a nonaxial velocity component. Some particles, however, approach the cusp along paths which permits them to escape out through the cusp.

The total loss rate through these cusp regions is determined by the "loss cone angle" and by the solid angle (in velocity space) subtended by the leakage cusp system. The loss cone angle is set by the field strength in the current-carrying coils which make the field, and the solid angle is simply the result of the geometry chosen. In the bi-conic mirror system the losses are predominantly through the equatorial cusp 135 because of its great extent entirely surrounding the plasma region.

In experimental and theoretical work aimed at using such "mirror" field systems to confine plasmas, a remedy for this defect was attempted by twisting half the field through 90° (so-called "baseball" geometry), so that the cusp leakage ring is split into orthogonal half-hemispheres. This has the effect of removing equatorial plane coherence for particles able to scatter out through the equatorial field ring loss angle. However, this twisting of the field half-space does not change the basic topology of the bi-conic system and, although still macroscopically stable, the plasma will continue to be lost predominantly through the (now-bifurcated) equatorial ring cusp in the confining field.

Studies have also been made of the solenoidal mirror geometry, in which end point cusps act as "reflectors" of particles at the ends of the quasi-solenoidal field system. As previously noted, however, the solenoidal field region itself and its connection regions to the end cusps are inherently macro-unstable with respect to plasma/field interchange displacements. Thus, while the ring cusp losses of the bi-conic cusp mirror geometry have been removed, they have been replaced by new losses due to instability of the basic central field configuration. In experimental and theoretical work on such systems a partial remedy for this defect was obtained by adding current-carrying conductors between the mirror coils, parallel to the coil system axis. These parallel conductors (sometimes called "Ioffe bars", after their Soviet inventor) provide fields which yield longitudinal surface cusp geometries which are inherently stable, but which embody particle losses through the longitudinal line cusps thus formed between conductors. In addition, locally unstable regions still exist between the central longitudinal fields and the end mirror point cusps, which lead to enhanced losses.

The virtue of the simple bi-conic mirror cusp field system is that it is inherently macroscopically stable and is thus subject only to microscopic plasma loss phenomena (e.g., collisional guiding center transport). Its defect is the very large conical sector equatorial ring cusp loss region. Polar end point cusp losses can be made small in most systems of interest by use of large mirror field ratios (particle velocity-space loss cone angle is given by $\sin^2 \theta = [Bo/Bm]$, where Bo is field strength at plasma center and Bm is field strength on the mirror cusp axis). In addition, the point cusps can be used easily for injection of plasma ions and/or electrons into the central region of such a magnetic confinement geometry. A mirror system which contained only point cusps would provide an ideal stable field/confinement geometry.

Some efforts have been expended investigating other geometries for magnetic plasma confinement. One such effort is that of R. Keller and I. R. Jones, "Confinement d'un Plasma par un Systeme Polyedrique a' Courant Alternatif", *Z. Naturforschg.* Vol. 21 n, pp. 1085–1089 (1966). Octahedral and truncated cube sutems were explored. These are labeled 200 and 230 in FIG. 2. Keller and Jones noted that the octadedron has two symmetry axes A and B. The truncated cube system, on the other hand, has three axes of symmetry C, D, and E. Keller and Jones experimentally explored neutral plasma heating and confinement by driving alternate interlaced coil sets at a (high) frequency of 4.7 MHz. It should be noted that the two interlaced fields used in this work were of opposite type, one being solenoidal and the other opposing bi-conical; thus alternation between field sets/states caused an inversion of field direction with each half cycle. It is not clear that alternation between such states is most effective for plasma confinement or heating. However, losses are greatly reduced from those of a conventional bi-conic equatorial ring cusp system of comparable size. Stable confinement was obtained at the experimental conditions, with modest heating observed, and the presence of a "spherical wave" was noted in the plasma.

Another extreme of magnetic confinement geometry is disclosed in U.S. Pat. No. 4,233,537 to Limpaecher. Therein it is proposed to confine neutral plasmas within a cylindrically symmetric volume whose surface contains an array of 1250 alternating magnetic poles, with axial electron injection to establish a negative plasma potential. In this system, plasma is to be confined by the surface magnetic multipole fields and constrained by the cylindrical interior negative electric potential field. In all of the arrangements considered there were always macroscopically unstable regions somewhere on the surface (e.g., at the end regions of the cylindrical volume), and the electrostatic field was never suggested as the primary or sole confinement field for plasma ions.

In both magnetic and inertial-confinement approaches the plasma heating is made to occur by statistically random collisional processes, either while under growing compression conditions or (with externally-driven energetic particles) while "trapped" for a sufficient length of time in a "confining" magnetic field geometry. It would appear to be desirable, however, to provide a more direct and non-statistical non-random process for energy addition to gain energy directly by "falling" through the negative electric potential which provides their confinement.

In the tokamak (and all other magnetic confinement systems) configuration, charged particles are lost from the system (to its walls) by transport of plasma ions and electrons across the magnetic fields by microscopic inter-particle collisions (which abruptly shift the particle gyration radius "guiding center"), and by other processes in which plasma particles, ions, and electrons act collectively to yield macroscopic transport losses of "groups" of particles across the supposed "confining" magnetic fields.

Microscopic inter-particle collisions are both inevitable and necessary in plasmas in which it is desired to achieve inter-particle nuclear reactions. Thus in a plasma confinement system of interest for the attainment of nuclear fusion reactions, it is inherently necessary that plasma particles be lost from the field geometry by collisional "jumping" of the gyro centers (above). Without collisions there can be no fusion (or other nuclear) reactions; thus the attainment of conditions for fusion reactions ensures that the magnetic field can not confine the plasma, but can only constrain its (inherent) loss rate.

In short, magnetic fields can confine (without losses) only plasmas and charged particle systems in which no collisions occur between particles. Since collisions will occur if two or more particles are in a given magnetic field system, it is evident that magnetic fields can not completely confine plasmas at densities of utility for nuclear fusion (or other nuclear) reaction production; they can only inhibit their unavoidable loss rate. In such systems the particle losses therefrom constitute an energy loss which must be made up by continuous injection of power to the system, in order to keep it operating at the desired conditions of plasma density and/or temperature. Research work to date in nuclear fusion has shown that considerable losses are inherent in the use of magnetic fields for plasma confinement.

In general it has been found that conceptual magnetic confinement systems for the production of useful fusion power generation must be very large when based on low-power-consumption magnet coils of super-conducting material. Alternatively it has been found that small tokamak systems with small power input to the plasma region can be based on magnet coils of normal-conducting materals but will require very large power input to drive these coils.

Thus, all conventional magnetic approaches to the generation of fusion power are practically unable to take advantage of the natural large energy gain (G=ratio of energy output to energy input per fusion reaction) inherent in the fusion process. This "natural" gain can be as large as G=2000 for the fusion of deuterium (D or $H_2$) and tritium (T or $H_3$), the two heavy isotopes of hydrogen (p or $H_1$).

Furthermore, a magnetic field can not produce a force on a charged particle unless that particle is in motion. If it is at rest with respect to the system—and therefore not attempting to leave the system—it will not feel any force in a magnetic system. It will experience a force in such a system only if it is trying to escape from (or otherwise moving in) the system. When moving, the force exerted on such a charged particle by a magnetic field is not oppositely directed to its direction of motion, it is at right angles to its direction of motion. The magnetic force on such a moving particle is thus not a "restoring" force, it is a "deflecting" force. Because of this the field is relatively ineffective in holding neutral plasmas of equal numbers of charged particles together, as in tokamaks or mirror field geometries used in fusion research. This results in large power requirements for the machinery needed/used for confinement and plasma heating in such devices constructed according to these concepts, and the energy gain (G) potentially achievable is found to be limited by practical engineering considerations to the order of $G \approx 2$ to 6.

Electrostatic systems have also been explored for the confinement of plasmas. The simplest such system is that with a spherical geometry, in which a negative potential is maintained at the center of a spherical shell by an electrode (cathode) mounted at the center. Positive ions introduced into such a geometry will be forced toward (and will "fall" to) the center until their mutual Coulombic repulsive forces exactly balance the inward-directed forces on them by the applied radial fields. In this "fall" the ions will acquire particle energies equal to the electric field potential drop. In principle, such systems offer very efficient means of reaching particle energies of interest for fusion reactions (efficiency of energy addition and thus to particle "heating" by this means is nearly 100%, which enables the achievement of very high gain G values). Unfortunately the ion densities which can be achieved by this means, within the limits of externally-supplied electric fields which are practically attainable, are too small to be of interest for fusion plasma reaction production at a useful level.

The absolute density of ions can be increased by the addition of electrons to such a system, to yield a (net) neutral plasma whose ion and electron densities are grossly equal. However, it can be shown (Earnshaw's theorem) that a (neutral) plasma can not be confined by an electrostatic field of this type. This is because the plasma ions and electrons will be subject to oppositely-directed forces in the static field and will separate, thus producing a local field gradient (due to their charge separation) which exactly cancels the applied field. In this condition the plasma can move across the field as fast as electrons are lost from its outer boundary. The speed of motion of electrons escaping from such a system is limited to that of ion motion, as the two oppositely-charged particles are tied together by their dielectric field. In a system with a static centrally-negative spherical electric field configuration, as described above, there is no force field to inhibit electron loss from the outer boundary or periphery of such a neutral plasma.

Previous workers have recognized the value of electrostatic forces for plasma/ion confinement. The earliest work was reported by William C. Elmore, James L. Tuck, and Kenneth M. Watson, "On the Inertial-Electrostatic Confinement of a Plasma", *Phys. Fluids*, Vol. 2, No. 3, pp. 239–246 (May-June 1959). Elmore et al proposed to overcome the difficulty of the Earnshaw's theorem limit (mentioned above) through the generation of the desired spherical radial field by the injection of energetic electrons in a radially-inward direction. This is depicted in FIG. 3. In this pioneering work electrons were to be emitted from the inner surface of a spherical shell 300 through a (screen) grid 310 at high positive potential (100 kev). Electrons so injected would pass through the grid and converge radially to a central region 330 where their electrostatic potential at the sphere center was equal to the grid injection energy. This large negative electrostatic potential, maintained by continuous electron injection (to make up losses) could then be used to trap positive ions in the system. Ions "dropped" into such a potential well would acquire energy at the "bottom" of the well (i.e., at the sphere center) equal to the negative potential established by the electron injection energy. This scheme obviously depends on the conversion of kinetic energy of injected electrons to negative electric potential fields and is thus an inertial-electrostatic method of plasma confinement. No means were provided to inhibit electron loss at the sphere surface.

Somewhat later it was shown that such a negative potential well system is unstable to various perturbations if the confined ion density exceeds a certain level. H. P. Furth, "Prevalent Instability of Nonthermal Plasma", *Phys. Fluids*, Vol. 6, No. 1, pp. 48–53 (January 1963). This level was shown to be so low that the system was not of practical interest. Furth agreed with Elmore et al that the system would be unstable, and further showed that such self-confined inertial electron-/ion systems using electrostatic confinement were inherently unstable. That is, systems in which confining non-equilibrium electrostatic fields are to be produced by inertial-electrostatic conversion of one charged component would be unstable above some critical density of the other component. For confinement by electron injection the ion density limit is too small to be of interest.

Another system for electrostatic confinement of plasmas is set forth in U.S. Pat. Nos. 3,258,402 (June 28, 1966) and 3,386,883 (June 4, 1968) to P. T. Farnsworth. Following the approach further research has been conducted into the feasibility of electrostatic confinement of ions. See, e.g, Robert L. Hirsch, "Inertial-Electrostatic Confinement of Ionized Fusion Gases", *Jour. Appl. Phys*, Vol. 38, No. 11 (October 1967). Hirsch also utilized conversion of inertial energy for the production of central electrostatic fields. His work followed along the lines developed by Farnsworth (above), and utilized spherical grid structures and geometries as outlined in his U.S. Pat. Nos. 3,530,036 and 3,530,497 (both Sept. 22, 1970). Hirsch used injected ions (of D and T) rather than electrons. The several-thousand-fold mass difference (ions heavier than electrons) allowed the attainment of much more stable field/ion structures than predicted for electron injection, and the devices tested by Hirsch achieved fusion reaction rates in excess of 1.0E10 reactions/second on a continuous basis.

However, the geometry which was used was not completely spherical; the ions were injected by six opposing ion guns mounted in opposite cubic-faced array. Later analysis suggests that this geometry as well as other conditions of the experiment caused intersecting beam phenomena and ion/gas collisions to dominate over other phenomenologies important to electrostatic confinement, as these were envisioned by Farnsworth and Hirsch in their earlier work. D. C. Baxter and G. W. Stuart, "The Effect of Charge Exchange and Ionization in Electrostatic Confinement Devices", *Jour. Appl. Phys.*, Vol. 53, No. 7, pp. 4597–4601 (July 1982). In particular, it appears that current amplification by multiple transits across the potential cavity did occur, with consequent beam buildup, in part due to reflection of ions by the grid structures opposing their own injector structures, as indicated by the sensitivity of neutron output to injection beam alignment. Here (as in the work of Elmore et al) no mechanism was invoked to provide any other confinement of electrons at the surface or periphery of the approximately-spherical system geometry.

The use of electron injection to produce negative plasma potentials for enhanced confinement in magnetic systems was examined in Soviet work on magnetic mirror systems. Work of the Soviet group at Kharkov, as reported in the Annals of the New York Academy of Sciences, Vol. 251, the proceedings of a conference held Mar. 5–7, 1974 on *Electrostatic and Electromagnetic Confinement of Plasmas and the Phenomenology of Relativistic Electron Beams*, (L. C. Marshall and H. L. Sahlin, ed., 1975). See, for example, Levrent'ev "Electrostatic and electromagnetic High-Temperature Plasma Traps" and also Dolan "Electric-Magnetic Confinement". These systems used physical ring electrodes in the ring cusp region of bi-conic cusp systems to inhibit plasma ion losses, and employed axial electron injection in cylindrical geometry to enhance ion magnetic confinement by producing negative potentials in the plasma region of this and of solenoidal Ioffe-bar-type mirror systems. Similar work by Blondin and Dolan invoked fixed cusp-region anode and cathode structures to aid magnetic cusp/mirror plasma ion confinement by the imposition of electrostatic fields in both the polar and equatorial loss cones. D. C. Blondin and T. J. Dolan, "Equilbrium Plasma Conditions in Electrostatically Plugged Cusps and Mirrors", *J. Appl. Phys.*, Vol. 47, No. 7, pp. 2903–2906 (July 1976). R. L. Hirsch had earlier studied this method to aid confinement in solenoidal mirror magnetic confinement systems. U.S. Pat. No. 3,655,508 (Apr. 11, 1972). Still other work utilized ion injection to establish positive potential fields in bi-conic or mirror cusp geometries, or in twisted bi-conic mirrors used as "plugs" at the ends of linear solenoids (See, e.g., F. L. Hinton and M. N. Rosenbluth, "Stabilization of Axisymmetric Mirror Plasmas by Energetic Ion Injection", *Nucl. Fus.*, Vol. 22, No. 12, pp. 1547–1557 (1982), and P. J. Catto and J. B. Taylor, "Electrostatic Enhancement of Mirror Confinement", *Nucl. Fus.*, Vol. 24, No. 2, pp 229–233 (1984).) All of these approaches used fixed electrodes and/or ion or electron injection to establish electric potentials to aid magnetic plasma confinement systems, not for the direct electrostatic confinement of ions.

In summary, previous work in inertial, magnetic, and electrostatic confinement aimed at the confinement of charged particles (ions), for the purpose of creating conditions useful for the generation of nuclear fusion reactions between them, has shown that:

(1) Magnetic fields do not provide restoring forces to charged particles in motion, or to confine plasma particles; they provide deflecting forces, at righ angles to the direction of motion of the particles. Electrostatic, electrodynamic, and other electric fields can provide direct restoring forces for the confinement of charged particles.

(2) Even the most favorable magnetic confinement geometries lose charged particles by gyro guiding center shifting due to microscopic collisions between particles. Such collisions are essential for the creation of nuclear reactions.

(3) Collisions between particles of like sign have the most effect on ion losses. Such collisional losses are governed by the gyro radii of ion/ion collisions in conventional magnetic confinement schemes. Electron gyro radii are very much less than those of ions of comparable energy.

(4) Electron and ion motions in magnetic fields are of opposite sign. This results in the electric polarization of the plasma, with the establishment of an ambipolar dielectric field. Plasma losses are then set by the rate of ion/ion transport collisions across the field.

(5) Inertial-electrostatic potential wells estblished and maintained by charged particle injection alone and held solely within electric field structures are stable only for confinement at particle densities below a certain critical value. This is found to be too low for the production of nuclear fusion reaction rates useful for power generation.

SUMMARY OF THE INVENTION

Considering all of these facts and features it appears that useful confinement of plasmas can be achieved by an improvement on all prior concepts, by new and unique uses and combinations of magnetic and electric fields, and by use of inertial forces. The current invention accomplishes this by:

(a) Using a substantially spherical magnetic field geometry which is macroscopically and magnetohydrodynamically (MHD) stable for confinement of charged particles to confine a plasma which is non-neutral with excess density of electrons. This requires use of a magnetic field geometry which is everywhere convex towards its confined ion/electron/plasma system.

(b) Using a magnetic field geometry with minimum losses; e.g., a "mirror" type system without line or ring cusps—its cusps are all point cusps. The geometries of interest utilize special polyhedral configurations for magnetic field generating means. Oscillation of single polyhedral or multiply-faceted interlaced polyhedral surface fields may be useful to provide good magnetic surface "reflection" of confined electrons, by causing the time-averaged fields to appear "quasi-spherical" over the electron gyration time at the local field strength.

(c) Using the excess electrons thus confined to produce a central electrostatic field which is stable (by virtue of stable electron confinement by the magnetic field) and in which the desired negative potential can be maintained at any density of "trapped" ions (less than the total density of electrons).

(d) Injecting electrons at high energies (e.g., 10 kev to more than 1 Mev, depending on the ions chosen for confinement) into stable magnetic configuration, to establish negative potential wells of depths sufficient to confine ions at energies at which nuclear fusion reactions will occur.

(e) Adding ions to the system by injection, to attain ion densities needed for useful nuclear fusion reaction rates, and to provide high pressure to support the central plasma core, by dynamic conversion of the energy of injected ions falling into the confining potential well (e.g., as by two-stream instability coupling of momentum from the in-falling ions to the core field structure).

It is the object of this invention to overcome the defects and deficiencies of previous concepts for electrostatic confinement of ions by utilizing the confinement ability of (MHD stable configurations) of magnetic fields for the confinement of electrons, so that stable electric fields produced by their confined distribution in turn may be used to confine the ions.

It is further the object of this invention to utilize these means for ion confinement to achieve densities of such confined ions at values large enough to allow nuclear fusion reactions to occur at useful rates.

It is further the object of this invention to provide a confinement means for ions which can confine a variety of ions of interest for nuclear fusion, at particle energies up to the range of 400 kev to 2 Mev, as well as at smaller ion particle energies.

The concepts of the current invention provide for a device able to ensure stable entrapment of positive ions which are injected into negative electric field configurations capable of confining these positive particles. These electric potential configurations are formed by spatially-stable distributions of electrons from electron injection into stable magnetic field configurations, to yield net excess electron (over ion) density, and thus net negative internal potential distributions.

These stable quasi-spherical magnetic field configurations are all point-cusp mirror fields, placed with alternating sign (or sense) on the surface planes of any of the regular polyhedra when truncated (except for the octahydron untruncated; the octahedron is just a truncated tetrahedron); or on any other arrangement of polygonal faces on or extending from these surface planes, or forming any other ordered polyhedron. A feature of importance to optimal functioning of the current invention is that the arrangement of polygonal faces must be such that all intersection points (between faces) are surrounded by an even number of faces. Another feature of importance is the possible oscillation of the surface magnetic fields at frequencies high enough so that good surface magnetic "reflection" is provided to the confined electrons.

Ions may be injected with any energy from (nearly) zero up to (or greater than) that of the energy of injected electrons. Electrons may be injected with energies of 10 kev up to several Mev, but must be injected with sufficient energy to establish central negative electric potential wells of greater depth (strength) than the energy level at which it is desired to promote or contain ion-collisional interactions among the ions trapped in the negative potential well.

Increasing electron injection energy (voltage) may lead to negative potential well depths great enough to initiate nuclear fusion reactions between injected/confined plasma ions of the light elements and their isotopes (e.g., H, D, T, Li, B, Be, etc.). Increasing injection energy of the ions may likewise lead to such wells, through the mechanism of "virtual electrodes" orginally discussed by Hirsch and Farnsworth. Alternatively, some form of both effects may be used in the current invention.

In devices operated at conditions capable of creating nuclear fusion reactions, the strength of the (surface) magnetic fields and (internal) electric potential fields is such that: (a) fusion products will escape entirely from the field regions; (b) unreacted ions will be trapped in the well by the electric fields, and; (c) electrons will be trapped internally by the magnetic fields. This is a result of the fact that the radii of gyration of charged particles in the magnetic fields of the device are much larger for fusion products than the dimensions of the device, are comparable for trapped ions, and are much smaller for electrons. This feature is unique among all other concepts for the confinement and generation of nuclear fusion reactions.

One consequence of this feature is that fusion reaction energy carried by fusion product ions is not deposited locally in the entrapped plasma by collisions therewith but, rather, is carried outside and away from the source region in which the reactions themselves are caused to occur. Thus, fusion energy so created does not contribute to the "heating" of plasma ion, and the device of the current invention is not an "ignition" machine, nor does its functioning depend upon "heating" a mass of plasma ions to a sufficiently large temperature to ensure significant fusion reactions, as is the case for all other magnetic and/or inertial confinement concepts for the attainment of fusion.

Electron and/or ion injection may be steady-state (cw) or pulsed at frequencies from a few Hz to several hundred MHz. This frequency may be made equal to the frequency of oscillation of current flow in the magnetic field coils, if these are driven in an oscillatory mode. Such pulsing of the injection beam which is responsible for establishing the potential well which confines the ions so that they will react among themselves, will naturally cause the inter-ionic reactions to oscillate with the frequency of oscillation of the well induced by the injection pulsation. In such conditions the release of energy from ion nuclear collisional interactions will oscillate as well, and so will the output of (charged) collisional reaction products.

When operated in such a pulsed or oscillatory mode, nuclear-reaction-generated energy may be coupled into oscillations of the confined plasma, itself, to yield amplification of the pulsations and thus to yield high frequency radiative power output, or to yield oscillation of surface potentials on the container walls surrounding the plasma region, and thus to surface (spherical) wave generation. By this means the device can become a self-amplifying, self-powered generator of microwave or other radio-frequency energy. If operated with electron injection currents, ion densities, and magnetic fields which allow large power gain to occur, such a device can be used as a powerful source of radio-frequency energy, for radar, communications, power-beaming, energy beam weapons, etc., with no external source of main power.

At the onset of fusion reactions in the device, the fusion product ions will escape from the system, leaving behind their electrons, to yield a still-more-negative confining well. This could lead to a "runaway" effect in which continuing reactions yielding fusion products create an ever-deepening well, which in turn increases the fusion rate, which deepens the well more, etc. This process will be stopped by burnout of the ion fuel in the well, by arcing or other "shorting" or destabilizing effects, or by reaching stable burn conditions in balance with the ion and electron injection rate, and the rate of escape of electrons and of ions from the surface of the confinement region (i.e., from the magnetic field). The nature of this self-initiated creation of deeper potential wells will depend upon the species of ions used in the device, and undergoing fusion reactions. If all the ions involved carry only single nuclear charges (i.e., if all have only one proton in the nucleus), then the onset of fusion reactions can lead to a well-deepening effect, as described above, only for a limiting transient period. This transient will be damped out by the continuous injection of new electrons and ions, to reach a new stable density distribution. However, if the ions involved carry more than one proton in their nucleus and are injected only partially stripped, with a single charge, then the onset of fusion will trigger an exponential well-deepening process stabilizing at a new, deeper well depth as a result of each fusion reaction leaving more electrons behind in the well than were originally injected.

Particle injection (ion or electron) may be along the magnetic cusp field axes, or offset but parallel to them, or in an annular sheath around these axes. If annular, the particle sheath may be injected with or without rotation; if offset-axial or on-axis the particle beam may be injected with or without rotational or nutational motions. If rotation/nutation is used in the injection process, this will have the effect of preventing the particles from "falling" directly radially inward into the potential well, towards zero radius. Rather, such particles will be constrained to converge to a minimum radius greater than zero on account of the angular momentum they possess by virtue of the rotational momentum with which they were injected. The beneficial effect of such angular momentum on stabilization of the confining potential well has been shown by experiment. J. T. Verdeyen, et al, "Recent Developments in Electrostatic Confinement—Experimental", *Ann. of the N.Y. Acad. of Sci.*, Vol. 251, May 8, 1975. In these experiments it was also shown tht the introduction of angular momentum results in formation of a "virtual" central electrode of small radius, and in the reduction of well depth and maintenance of parabolic shape of the well. Ions also may be injected in parallel with electrons (annular and axial beams) or opposing the electrons (opposite magnetic cusp faces on the polyhedral configuration (used), or in opposing each other, or in parallel with ions, or in any other fashion recognized to be appropriate by one of ordinary skill in the art.

Fusion reaction products will generally escape regions containing the plasma, electrostatic fields, and electrons, and be deposited in and on structures around but outside of these regions. Since these products are all positively charged and carry high energy (several Mev each) their energy may be converted directly to electrical energy in external circuits by causing the external structures (on which the fusion products impinge) to operate at high positive electric potentials (voltages). With such an arrangement the positively-charged fusion products must escape "up hill" against the applied positive potentials, and can drive electrical energy into any circuit to which the external structures are connected and which closes back to the plasma/electron/well region.

The pressure of particles in the well will be supported by the external magnetic field which confines the electrons, through the inertial effects of conversion of the kinetic energy of in-falling ions to electrostatic dynamic pressure on ions confined in (but moving outward from) the central core of the potential well reacting volume. This well itself is produced by the conversion of the inertial energy of injected electrons to the energy of the well depth at the electrostatic potentals established by the stably-confined electron density. This electrostatic well gives energy to the in-falling ions, which in turn couple their thus-acquired energy of motion (and momentum) into confinement pressure on the core. The kinetic energy of injected electrons thus, through the medium of the electrostatic well, is transformed into the kinetic energy of in-falling ions.

The ratio of momenta of ions and electrons of the same energy is given by the square root of the ratio of their masses, thus this transformation has the effect of producing an ionic "gas" whose (dynamic) pressure is very much larger than the equivalent (dynamic) pressure of the injected electrons. In addition, the convergence of the quasi-spherical geometry of the polyhedral configurations of interest increases the local dynamic pressure by the square of the inverse ratio of radii from the outer (electron injection) radius to the inner (ion dynamic pressure confinement) radius.

As an example of these effects, if the ions are those of deuterium ($D=H_2$) and the radius of the inner core is 0.1 that of the inner "surface" of the confinement field region, then the ratio of ion-generated pressure on the core to electron pressure on the (external) confining field will be roughly 6100:1. The physics phenomena invoked in this invention thus have the effect of creating an electrical "gas" inside the magnetic field region whose (dynamic) pressure at large radii is very much less than its pressure at small radii within the volume which it occupies.

For this reason, it is possible to contain and confine a high density of reactive ions in a small radius within a larger radius at which a relatively weak magnetic field is placed; it is not necessary for the magnetic field to provide the confining pressure over a large radius to hold the high density plasma together at the pressure at which it operates within the smaller radius core. For example, ion densities of 1.0E15 to 1.0E17 per $cm^3$ may be sustained in D at 100 kev with surface magnetic fields of only 1 to 10 kG (kilogauss).

The coupling of in-falling momemtum of the ions to ions from the core will be accomplished by multi-stream instability interactions, through quasi-spherical waves. In this the particles streaming inward and outward through each other will interact collectively, above some ion current density, through the generation of electrostatic waves which transfer momentum (and energy) from one stream to the other and operate over very short interaction distances (wavelengths). There will always exist a radius sufficiently close to the center at which the convergent density becomes large enough to initiate electrostatic wave instability interaction, hence this phenomena will always be available to provide dynamic pressure coupling to the core region. Note that scattering collisions in this geometry do not directly increase particle losses, because they occur near the center and their effect of changing the direction of motion still leaves all motion predominantly radial in vector direction.

It is important to note that requirements on ion beam injection power are minimal in an electron-injection-driven device, since most of the ion energy is acquired by "falling" down into the negative electric potential well set up by the electron injection. This potential well depth is established by the net excess electron density which is set up over the ion density contained therein. This is limited by the loss rate of electrons from the surface region of the polyhedral magnetic field configuration. Higher fields give smaller loss rates; larger injection currents allow larger losses. Thus, the balance between losses and input will set the level of excess electron density. Numerical calculations show that only modest electron injection powers are required with modest fields (as above) to yield very deep electrostatic wells for ion confinement (e.g., over 200 kev).

The power output is set by the rate of reaction within the central region, integrated over the volume of this region. The reaction rate is determined by the square of the ion density (and the product of reaction cross-section and particle speed), thus is limited by the ion current density in the central region. In-falling ions will converge as the inverse square of the radius, thus the reaction rate will tend to vary as the inverse fourth power of the radius. This very rapid dependence ensures that nearly all of the fusion energy generated in such a device will be generated in and around the center of the (structurally-empty) cavity confined by the external magnetic field, at the largest possible distance from the walls of the system. It will be somewhat like a little "star" burning in the center of electrostatic well cavity "void".

Numerical calculations show that the ion current densities required for total fusion power output at "useful" levels is much larger than those required for power balance makeup against electron losses, or for pressure support of the reaction core. To achieve this state requires a current multiplication or "gain" ($G_j$) achieved by the recirculation of ion (and electron) currents across the machine volume many times, until a sufficient ion density is achieved. The required current recirculation factor is found to vary roughly as the inverse fifth power of the major radius (R) of the device, so that $G_j \approx (1/R^5)$. Large devices thus will require less current "gain" than small devices, and it is clear that there must exist a size sufficiently large that the "gain" may be unity ($G_j = 1$), and that no current multiplication is required for operation of the machine at a breakeven power balance. Numerical calculations show that this size is approximately $R \approx 10$–20 m, and that $G_j \approx 1.0E6$ will allow $R \approx 20$–30 cm ($G_j$ values greater than 1.0E6 have been obtained in a variety of electron and ion magnetron tubes of other types).

Another feature of the device is the existence of a "black hole effect" (BHE) in respect to fusion burn reactions. This results from the fact that there must exist a radius at which the fusion reaction collision rate is sufficiently large that the total fusion reactions occuring per unit volume over the time of flight of an ion from this radius to the center of the machine would equal or exceed the total density of ions at this radius. For such a condition it is clear that all ions entering (i.e., falling into) this radius region will undergo fusion reactions.

BRIEF DESCRIPTION OF THE DRAWINGS

These and other aspects of the invention will become more clearly understood from the following description read together with the drawings, in which:

FIGS. 1A and 1B are diagrams showing the magnetic force lines for a conventional simple bi-conic magnetic mirror plasma confinement device as described above;

FIG. 1C is a diagram illustrating reflection of a moving charged particle at a point cusp, described above;

FIG. 2 is a diagram of a known polyhedral devices for confining plasma, described above;

DETAILED DESCRIPTION OF THE PREFERRED EMBODIMENTS

It is the object of this invention to achieve large ion densities in stably-confined plasmas, held in negative electric potential wells formed by magnetically-confined electrons. This is to be done by the means described below.

Electrons are injected along the field lines surrounding and entering the central (confined-plasma) volume. Injection is through point/polar magnetic cusps in an inherently confinement-stable magnetic mirror field system with minimum loss properties. Such systems are attained in the present invention by use of various polyhedral magnetic cusp confinement geometries using tetrahedral, octahedral, and/or dodecahedral configurations. Unlike the bi-conic mirror systems, such configurations have the property that coil windings may be made along their faces in such a way that no ring or line cusps are generated in the magnetic field geometry, all magnetic loss cones are through point or "polar" cusps, only.

Figure 3:
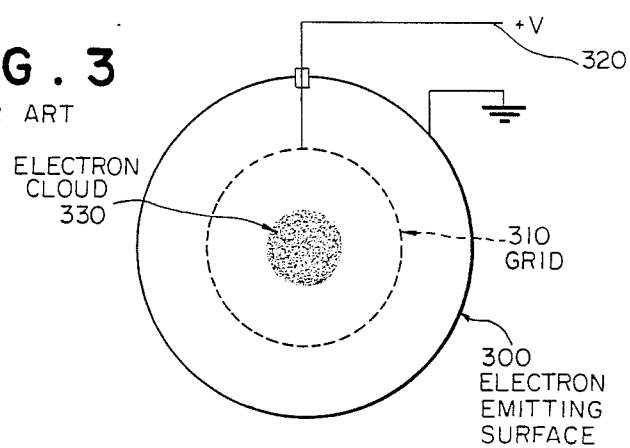
FIG. 3 is a diagram showing a known arrangement for electrostatic confinement of electrons, described above.
Figure 4:
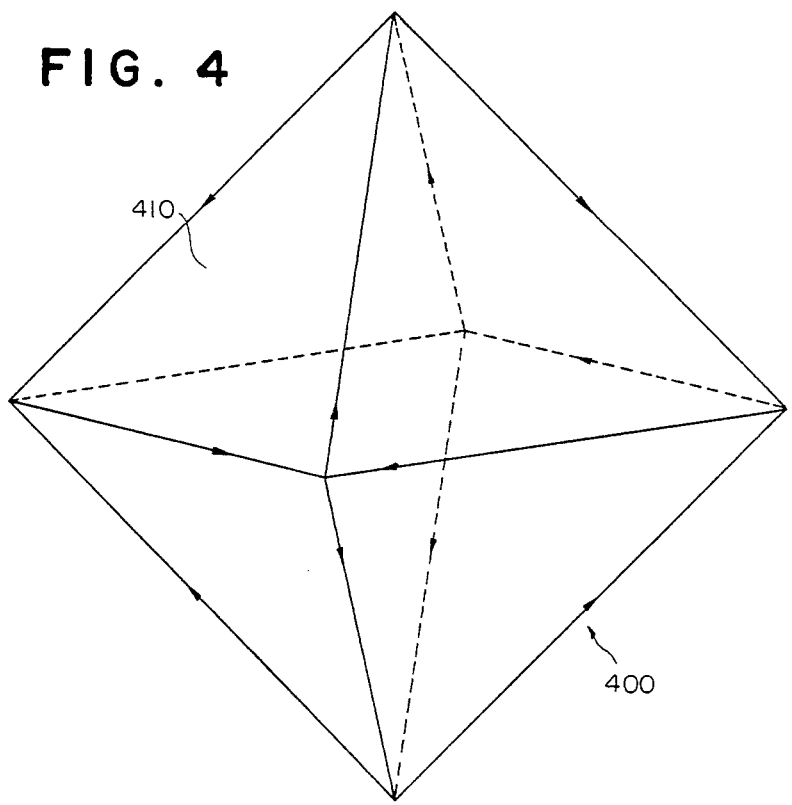
FIG. 4 is a diagram showing direction of current flow in an octahedral magnetic field generating and electron confining device according to the present invention.
Figure 8:
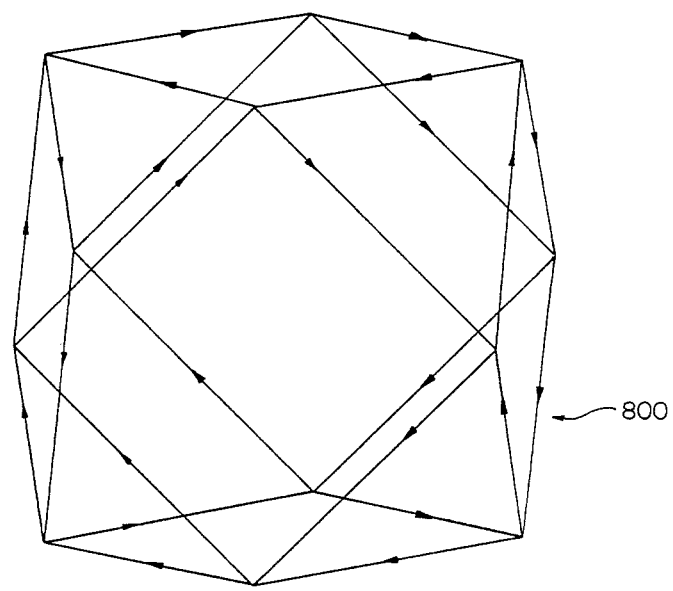
FIG. 8 is a diagram showing a current flow pattern in a truncated cube configuration of an ion confinement device according to the present invention.

The geometries preferred for this system are all of the regular polyhedra truncated on each point, except the octahedron, which may be used without truncation (it is already the truncation of the tetrahedron). Any other polyhedron in which all the magnetic vertices are surrounded by an even number of polyhedron faces may be used as well. For such figures the magnetic field point cusps (or "magnetic poles") are to be centered on each face of the polyhedron, in an alternating pattern, so that no two adjacent faces contain cusps of like sign. The criterion for this is simply that all vertices be surrounded by an even number of polyhedron faces. FIG. 4 shows possible current paths for such a cusp field arrangement for the octahedron, and FIG. 8 shows this for the truncated cube. It should be noted that opposing faces of such polyhedra all lead to bi-conic mirror fields of opposing sign, except for the truncated tetrahedron (the octahedron), in which the opposing fields are of like sign. The octahedron thus is equivalent to a fourfold intersection of mirror-cusp-ended solenoidal fields, in which each mirror cusp provides stabilization for its adjoining solenoidal field regions. The overall geometry of the relevant magnetic field will be referred too herein as "substantially spherical" or "quasi-spherical."

Attention will now be focussed on an octahedral system, starting with FIG. 4. As mentioned, the octahedron 400 depicted therein has current flowing along its edges to establish a magnetic field exhibiting point cusps on each face 410. The signs of the point cusps alternate between adjacent faces. One possible current flow pattern is depicted by the solid arrowheads shown in the drawing.

Figure 5A:
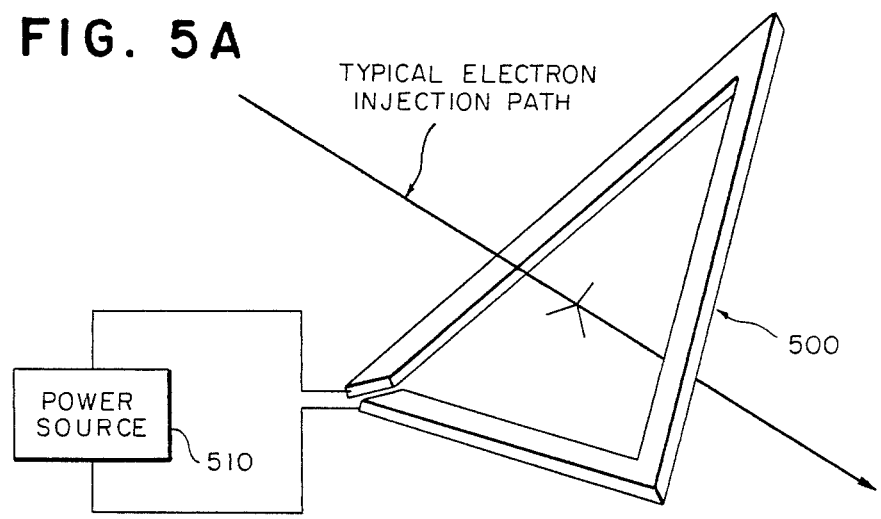
FIG. 5A is a partially schematic perspective of a single turn of a magnetic coil for face 410 of the octahedral magnetic field generating device depicted in FIG. 4.
Figure 5B:
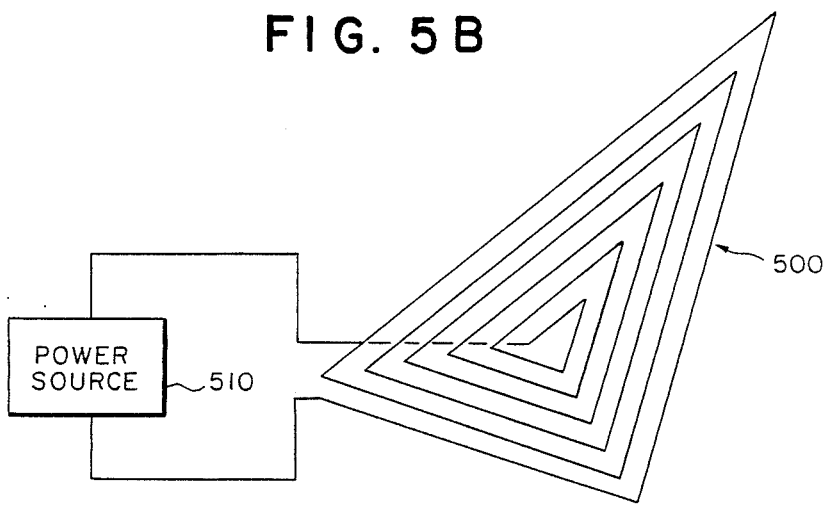
FIG. 5B is a schematic view of a multiple turn coil for the same face.

FIG. 5A shows one of the current carrying elements 500 used to generate the magnetic field. Current carrying element 500 is supplied with current from a power source 510. This power source could be d.c. as in 510 or a.c. as in 515. FIG. 5B shows a typical multiple turn current-carrying coil for the same polyhedral face.

It should be mentioned that each face 410 could conceivably be provided with a linear permanent magnet elements to generate the desired field configuration.

Figure 6:
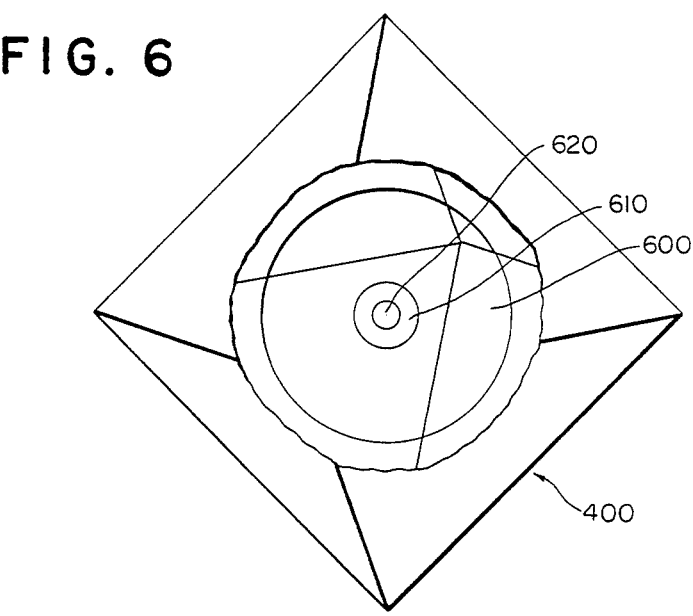
FIG. 6 is a partially cutaway and schematic view of a potential well and particle concentrations in an octahedral device according to the present invention.

FIG. 6 illustrates electric field and particle density distributions during operation of octahedral magnetic field generating or plasma confinement device 400. Details concerning the generation and configuration of the magnetic field are omitted for clarity. The electron and ion injectors used respectively to establish the negative well and "spill" ions into the well will be set forth in greater detail below in connection with the truncated cube system.

As depicted in FIG. 6, electrons injected into the octahedral magnetic field source become trapped by the magnetic field to form a substantially spherical negative potential well 600. The probability of locating an electron increases toward the center of the negative potential well. Electrons are originally injected to establish the negative potential well 600 and then continuously injected thereafter to sustain the negative potential well 600. Synonyms for negative potential well would include virtual cathode or negative space charge.

Once the negative potential well 600 is established, positive ions are injected into it at relatively low energies. The positive ions "fall" into the well, then increase in kinetic energy as they are drawn toward the center. The charged particles oscillate across the potential well. As the ions cross the center, they encounter and interact with other ions. It is anticipated that attainable plasma temperatures and confinement times will meet or exceed the thresholds required for useful levels of fusion reactions, in which fusion power generation is significant. This is depicted in FIG. 6 as a central region of maximum collision density 620. This collision density varies ideally as the inverse fourth power of the radius, and so is highly peaked at the center of the spherical well, although practical considerations prevent it from reaching near-infinite density as r approaches zero.

Figure 7A:
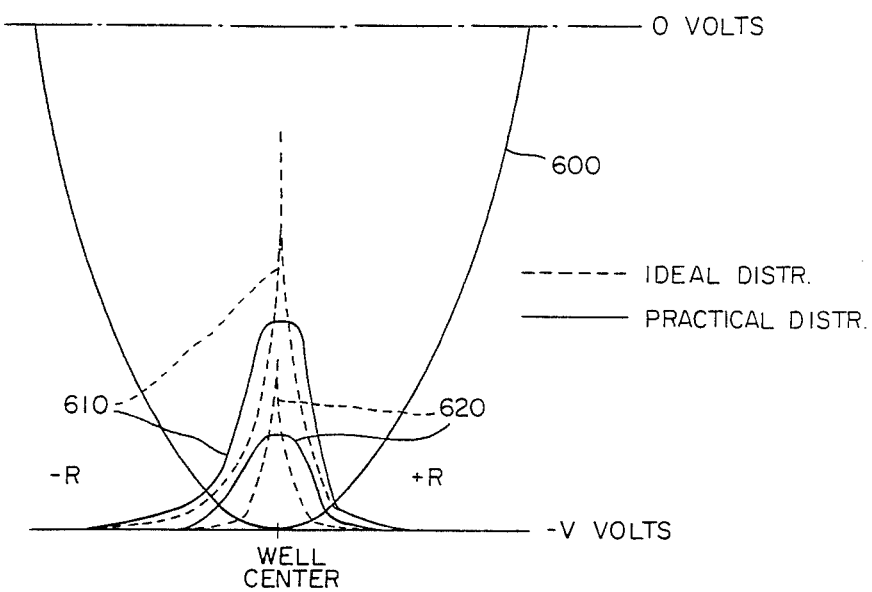
FIG. 7A is a cross-sectional graph and FIG. 7B a plan view of the potential well and ion concentrations in the present invention.
Figure 7B:
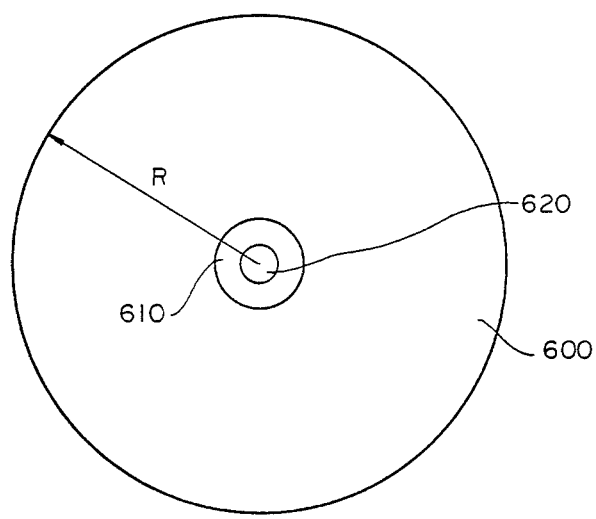

The negative potential well 600 is also depicted graphically in FIGS. 7A and 7B. The diameter of the well is designated 2R. The "depth" −V corresponds to the voltage used to accelerate the electrons for injection into the cavity. Qualitative density distributions are also depicted for the "ideal" case and the "practical" case.

Alternatively, ions may be injected to form a positive "virtual (anode) electrode" in the device center as described by Farnsworth and Hirsch, with electron injection in addition towards and through this virtual electrode, to form an ion-confining negative potential well within the ion-formed virtual anode. In either case ions will be trapped by negative potential wells which are, in finality, held in place stably by circulating electron currents tied to stable external magnetic fields of an appropriate polyhedral geometry which ensures low electron losses and ease of injection of electrons and ions into the system.

Inertial energy and momentum content of either or both the electron and/or ion injection beams can be utilized to provide compressional pressure forces to sustain high pressures in the central plasma core of the device. The conversion of inertial energy content of injected charged particles can be accomplished in the central (convergence) region by simple (Coulombic) collisional means (which may involve the generation of multi-stream instability interactions), or in the (surface) magnetic field regions by interaction through gyration on orbits on which the particles (particularly the electrons) are trapped when injected in an annular fashion, parallel to the cusp field lines. System power balance constraints arising from pressure balance considerations may limit the maximum gain (G) attainable in the system. More detailed consideration of this issue is given below, in connection with a summary of physics phenomena which are of importance in the operation of such systems.

Figure 9:
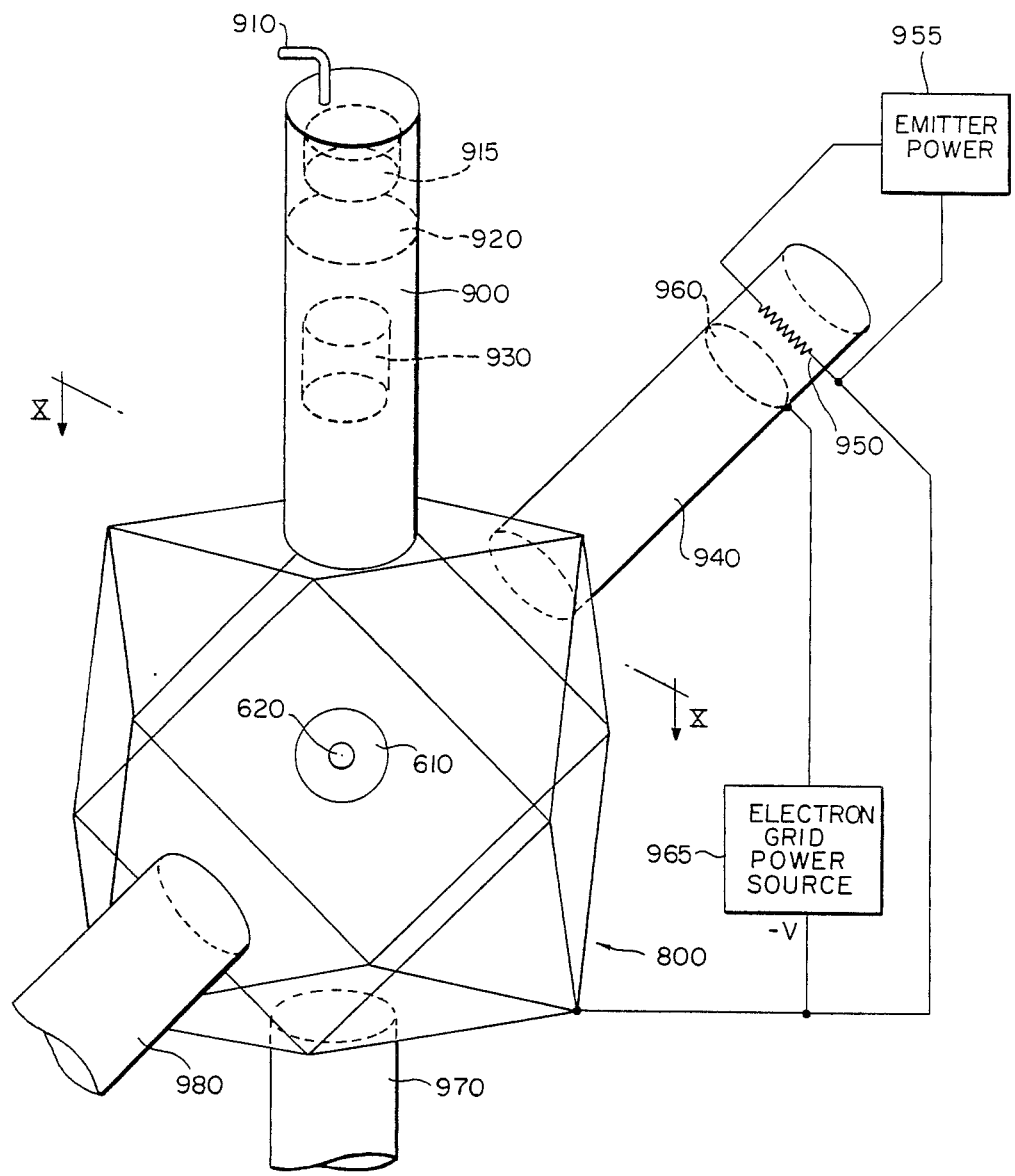
FIG. 9 is a diagram showing one possible arrangement for ion and electron injection into a truncated cube embodiment of the present invention.

FIG. 8 depicts a truncated cube system 800. A possible pattern for current paths along the edges is shown using small solid arrowheads. FIG. 9 provides details of electron and ion injection.

In the polyhedral systems of interest here electrons may be injected either directly along a cusp axis (or axes) or in an annulus around such axis/axes. If injected in an annulus, they may be injected either with paraxial velocity (along the local cusp field lines) or with a rotational component around the cusp central axis. A negative potential well is thus formed by the injected electrons converging to and trapped within the central region of the externally-driven magnetic field system. Ions are injected to be trapped in this negative potential well. These may be injected caoxially with the electrons, in an annulus surrounding the electron beam, with or without ion beam rotation, or in a central axial beam within an annular electron injection beam, or may be injected through magnetic point cusps on faces of the polyhedral system opposing the electron injectors.

In FIG. 9, numeral 900 designates a first positive ion injector. First positive ion injector 900 includes a gas inlet 910, an ionizing region 915, an accelerating grid 920 and an annular beam lens 930. Thus, first positive ion injector 900 is constructed and arranged to produce an annular beam centered on one of the axes of the truncated cube system.

Numeral 940 designates a first electron injector. First electron injector 940 is also centered on an axis of the truncated cube, and is constructed and arranged to direct an annular electron beam to the center of the interior volume of the truncated cube. First electron injector 940 includes an electron emitter 950 electrically connected to an emitter power source 955, and an accelerating grid 960. This grid is held at an electric potential +V above that of the emitter, by an electron grid power source 965, thus producing a central potential well depth of −V (FIG. 7A).

Additional injectors may also be provided. FIG. 9 illustrates the provision of an additional injector of each type, a second positive ion injector 970 arranged symmetrically opposed to the first positive ion injector 900, and a second electron injector 980 arranged symmetrically opposed to he first electron injector 940. The details of construction of these additional injectors will in general be the same as that of the opposed injector of the same type. Thus, these detals have been omitted from the drawing for clarity and will not be further discussed here.

Details for injector placement on the surface of an octahedral system are substantially the same.

Figure 10A:
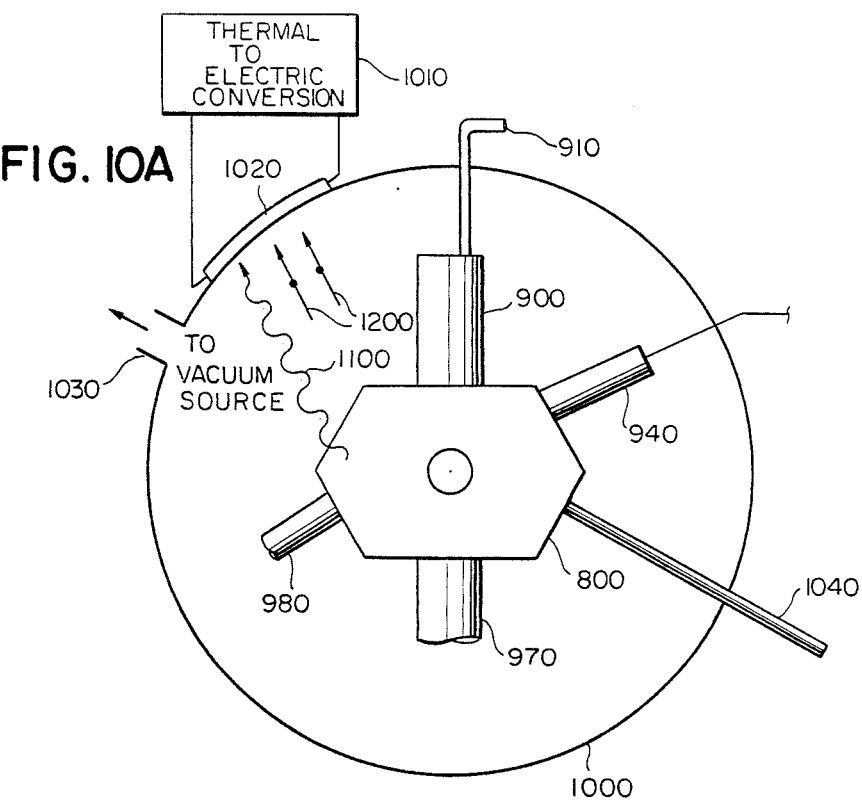
FIG. 10A is a diagram showing a cross-sectional view of the embodiment of FIG. 9 taken along X—X and arranged as it might be arranged to serve as a heat-generating and thermal/electrical conversion element of a power plant.
Figure 10B:
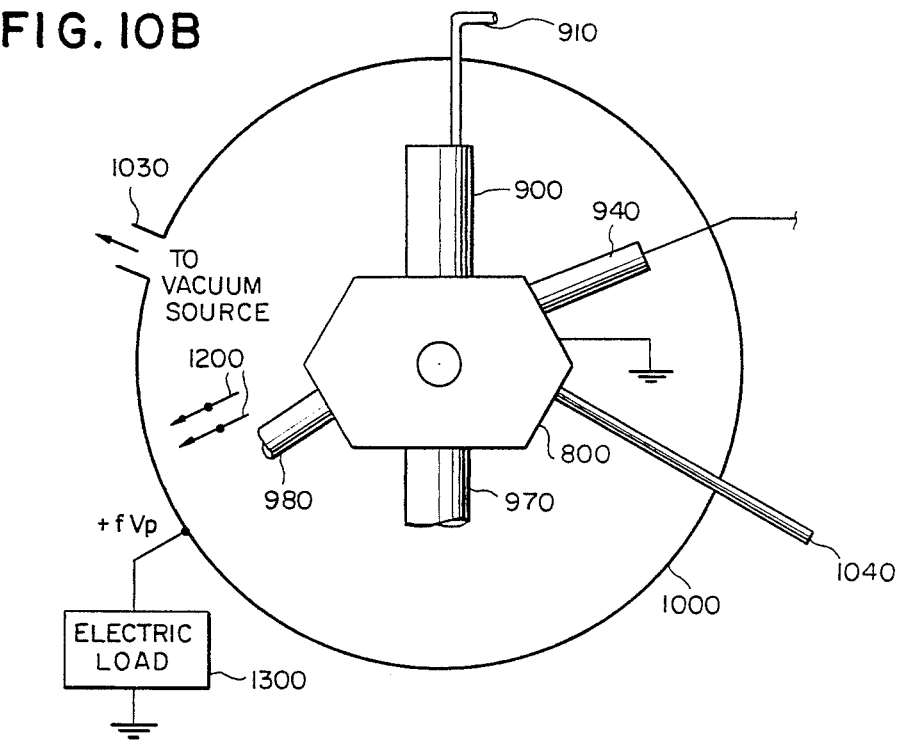
FIG. 10B shows a direct-electrical conversion element.

FIG. 10A illustrates one possible arrangement for the truncated cube system of FIG. 9 as a heat-generating element in a power plant. Truncated cube electron confiner 800 is shown in a cross-section taken along line X—X of FIG. 9. The system is placed with its associated injectors 900, 940, 970, and 980 in an evacuated containment structure 1000, depicted as a circular shell. As shown in FIG. 10A, containment structure 1000 is heated by absorption of radiation 1100, and by collisions with particles 1200, generated by the fusion reaction occurring in truncated cube region 800. This heat is thermally coupled to a heat exchanger 1020 (section of heat exchanger shown) in which a working fluid such as water absorbs heat. The heated water is then conveyed through thermal to electric conversion unit 1010 which converts the heat energy stored in the water into electrical energy. Thermal to electric conversion unit 1010 may be any known means for converting heat energy into electricity. FIG. 10B shows one arrangement for direct electrical conversion of fusion product particle 1200 energy by causing the particles to travel outward against a positive electrical bias fVp applied to the containing shell 1000.

The containment structure 1000 is evacuated through conduit 1030. The truncated cube electron confinement device 800 is cooled via cooling channel 1040.

The physics phenomena which control the action of such systems allow operation over a very wide range of sizes, from a few centimeters in confinement volume radius to many meters for such a dimension. Electron surface losses through and from the confining magnetic field will limit the power balance performance (i.e., the system power gain) of such devices. However, a simple estimate of maximum potential system gain can be obtained by balancing electron injection requirements with ion makeup needs to replace ions burned up by fusion reactions in the confined core. This method ignores surface losses, and limits electron power needs to internal requirements, only. If scaling of the fusion power is constrained by limiting energy flux through the boundaries of the device, then it is possible to calculate a maximum upper limiting system gain value (G+) for any size of machine.

Although unrealistically optimistic from an engineering standpoint, the results of such an analysis show absolute upper limits on system power gain. These (G+) values vary roughly linearly with system radius (R). The size of such devices can range from $R \approx 10$ cm radius to a radius of several meters (e.g., $R \approx 3$ m). Some crude estimates of these parameters are given in Table 1, for systems operating on DT or DD fusions. The upper limit system gains possible for use of other fuels and nuclear reactions will be less than those shown, because operation with such fuels will require larger negative electric potentials than for DT/DD. The inclusion of realistic external loss effects, and the requirements for beam injection to support central plasma core pressures will yield considerably lower practical gain values from such machines.

TABLE 1

ELECTRON/ION BURN BALANCE LIMIT ON POTENTIAL RANGE OF DT/DD SYSTEM PERFORMANCE

| B-FIELD SURFACE RADIUS (R) | REACTION POWER OUTPUT[1] (Pf, Mw) | DRIVING POWER INPUT[2] (Pi, kw) | UPPER LIMIT SYSTEM POWER GAIN[3] G+ = Pf/Pi |
|---|---|---|---|
| 10 cm | 0.1–1 | 2.5–25 | 4–40 |
| 30 cm | 1–10 | 8–80 | 12–125 |
| 1 m | 10–100 | 25–250 | 40–400 |
| 3 m | 100–1000 | 80–800 | 125–1250 |

[1]Surface energy flux at radius R is 0.08–08 kw/cm$^2$
[2]negative electric potential well is about 100–200 kev
[3]system power gain may saturate at about G < 1000

The smallest size of practical interest is that at which the dimensions of the confining magnetic field volume are comparable to or less than 10–100 times those of the radius of gyration (gyro radius) of electrons at given energy in the confining field at the periphery (surface) of the confined volume. Devices smaller than this will be dominated by losses of electrons out through the loss cones of the polyhedral field systems. Typically, gyro radii of 0.5 mm–5 mm characterize electrons at transverse energies of about 20–50 kev in magnetic fields of 1–5 kilogauss. Thus, electrostatically confined plasma systems of this type whose confinement volume radii are much smaller than about 10 cm will suffer from greater relative electron losses than will larger systems. Devices smaller than this will be dominated by higher relative power needs (than for larger systems) for cusp field magnets, and for requirements of central core pressure balance, rather than by electron losses due to injection requirements for surface loss makeup to maintain negative potential well generation capability.

These latter power losses will dominate the real power balance gain in larger devices. Their assessment can be made using electron transport coefficients from previous work in fusion plasma physics. Jacobsen et al have analyzed electron and ion losses in tokamak devices using essentially all of the models for electron transport scaling laws which are in current use in fusion research work. Robert A. Jacobsen, Carl E. Wagner, and Richard E. Covert, "System Studies of High-Field Tokamak Ignition Experiments", *J. of Fusion Energy*, Vol. 3, No. 4 (1983). Electron losses through the cusp loss cones can be minimized by appropriate injection/grid structures, geometries, and potentials. However, collisional losses of electrons within the peripheral region of magnetic field surrounding the central plasma are an unavoidable result of the need for significant surface electron densities to maintain the negative electric potential well required to confine ions at useful densities within the magnetic field structure. This surface collisional electron loss rate sets the minimum input power level of real devices, and hence limits their power gain.

The power density of operation is given by the product of ion density squared and the fusion cross-section product with the ion speed within the well. Since both the speed and cross-section increase with increasing well depth (in the range of interest here) the power density will be determined (strongly) by the depth of the confining electrostatic well in the central plasma region. Larger well depth will lead to larger power density for the particle reaction power. If this power output is limited to yield a constant surface flux of energy generated within the system, the required confining well depth will become smaller as the device size is made larger.

The ion density which can be sustained in such a system will be limited by the ability of the fields (both electric and magnetic) of the confinement system to support the pressure required by the ion density at the temperature of operation (i.e., at the "temperature" of particles at the energy of the well depth). The kinetic pressure p=nkT of the plasma must be balanced by an external pressure force to sustain it stably. As often pointed out, the electric field (E) required to "hold" a plasma ion density (i.e., by $\beta E^{**}2/8\pi = nkT$) sufficiently large to yield useful fusion power density does not seem practically attainable. See, e.g., S. Glasstone and R. H. Lovberg, *Controlled Thermonuclear Reactions*, D. Van Nostrand Co. Inc., Princeton, 1960, Sect. 3.13. Here $\beta$ is the "efficiency" of use of field energy density to sustain particle energy density.

Figure 11:
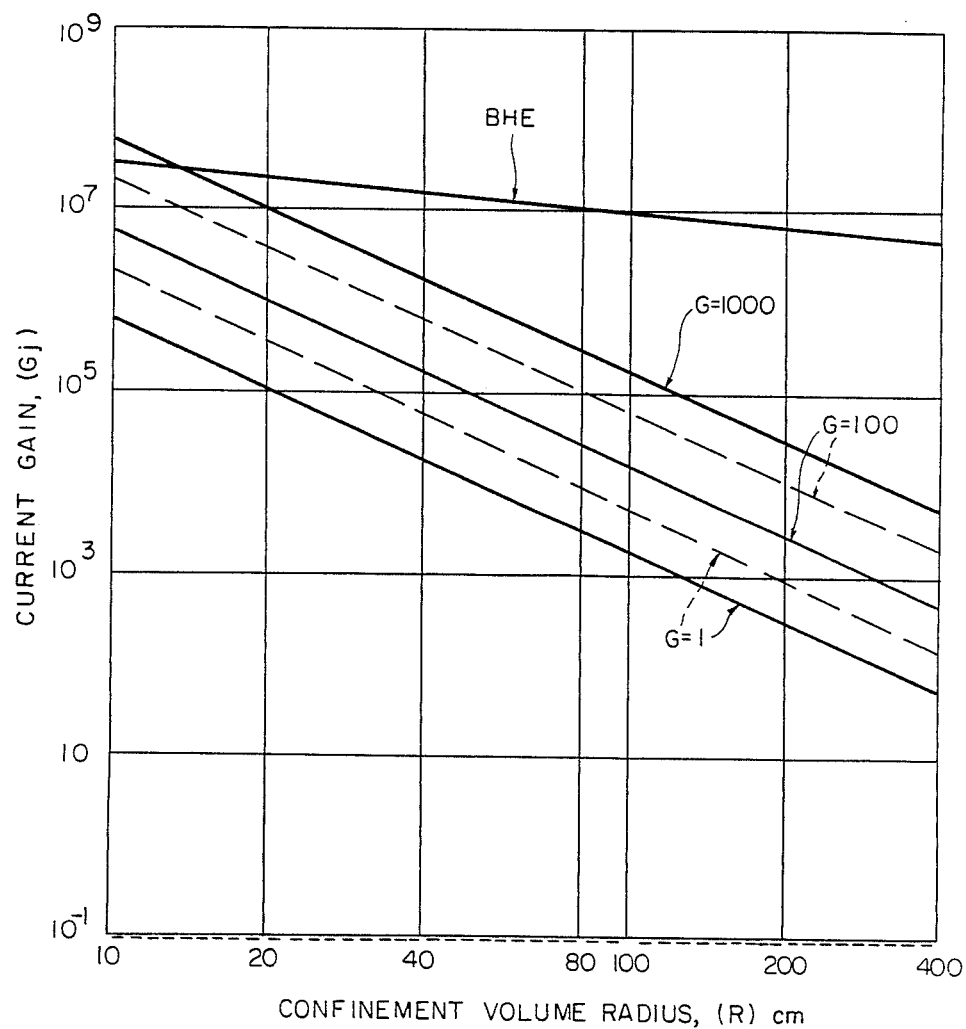
FIG. 11 is a graph showing the current amplification ($G_j$) required for a range of overall power gain (G) of the device as a function of size (R), for several charged particle reaction possibilities, and shows the conditions needed for attainment of the "black hole effect", described above.

Similarly, for magnetic confinement (e.g., by $\beta B^2/8\pi = nkT$) either the volumes are so large or the magnetic coil currents are so large that net power balances appear questionable. In the device concept and invention claimed herein these limits are overcome by the use of the circulating electron and ion current, through the confining electrostatic potential well region, as the means to couple momentum pressure support from a high pressure central core to a low pressure external surface. In effect the circulating or oscillatory centrally-convergent currents act as a special type of "gas" which exhibits a strong radial pressure gradient such that its pressure is very large at the center and small at the periphery of the electrostatic well region. Analysis of the current requirements for pressure balance shows that the net system gain G (for given surface injection current density) is related to the cavity current amplification factor $G_j$ and the system characteristic radius by $G=C1\ (R^{5})\ (Gj^{2})$. The coefficient C1 is found to be approximately $C1=3.0E-17$ /cm5 for R in cm. For a "break-even" system, G=1, and a current amplification of $G_j=10E5$ is required for a system radius of R=20 cm. Conversely, without any current amplification at all in the system, $G_j=1$, and G=1 will be attained at a system radius of R=2000 cm=20 m. Amplification factors of 1E6 and higher have been attained in a variety of electronic high power tube devices. FIG. 11 shows the current amplificaton factor Gj required for a range of net system gain $1<G<100$ for two reactive charged particle fuels, as a function of system size, R. Also shown are the conditions required for attainment of the BHE ("black-hole-effect") previously described.

Another physics feature of importance in system operation is that the fusion products will, in general, not deposit their energy in the plasma region (as in the case in "conventional" concepts for fusion), but will escape from this region to the structures and surfaces bounding the polyhedral magnetic/plasma system. In this escape, these particles will leave as positively charged ions, thus increasing the net negative potential of the plasma region. Each fusion event will cause an increase in the well depth which is confining the reacting ions, hence will cause an increase in the particle density and resulting inter-particle reaction rate which will, in turn, cause a further increase in the negative potential, the well depth, etc., etc. The onset of fusion reactions in a negative potential well of the type contemplated herein will thus initiate a self-generating process to increase the well depth and thus to increase the fusion rate. Under certain special conditions (of total recirculating ion current) it is possible, but not certain, that—once started—a reacting assemblage of this type could become self-sustaining without any further excess external electron injection, beyond that needed for balance with the ion injection rate itself. In any case, this self-generating-well effect might allow the reduction of electron injection for well sustenance, and thus could result in a reduction in the externally-supplied power required to drive the electron injection system.

For systems in which the electron-injection-generated well depth is kept the same for all system sizes (i.e., ignoring the scaling of minimum required well depth with system size, discussed previously, and ignoring the potential reduction in electron driving power which may result from self-generating wells, discussed above) it is possible to estimate the electron surface leakage power losses by use of the standard coefficients (mentioned above) for electron transport. Altenatively, electron surface losses can be estimated by use of the standard equations for electron thermal conduction transport across magnetic fields. D. L. Book, 1980 *Revised NRL Plasma Formulary*, Office of Naval Research, Wash., D.C. The loss rate of electrons will depend on the current amplification which is extant in the machine at the conditions of operation. Since this is set by pressure balance requirements, its choice is tied to the fusion reaction power output desired from the system. Analysis shows that the surface power loss due to electron collisional escape through the confining polyhedral field structures is set entirely by the local electron density in the surface field region, not by the injection current. For this reason, nearly an electron current multiplication is possible; however, the system power balance—and therefore its gain—will be fixed by this surface loss rate, rather than by the electron injection needed to make up for fusion-reacted ion burnup, used as the basis of Table 1. Analysis of such losses shows that the energy flux (Pe watts/cm2) of electrons escaping through the surface field region is just: $Pe=C2\ (n^2/B$ where n is electron density in electrons/cm$^3$, and B is the surface layer field strength, in Gauss. With this, it is found that losses can be limited to 1-25 watts/cm$^2$ with modest fields, while retaining electron densities large enough to ensure current amplification values of about $1.0E5<Gj<1.0E6$, and larger.

Operation of the system concept herein has been discussed as though always in a steady-state mode. This is not ncessarily the only way in which such systems may function. In particular, once a central electrostatic potential well is established, and ions are trapped therein, it may prove possible—and useful—to pulse the well to still greater depth by the rapid injection of energetic electrons (e.g., as from an electron accelerator) into the confined ion region. By this means it may prove possible to ignite a fusion-burning plasma within a potential well which then becomes self-sustaining, as discussed previously.

Another area in which oscillatory or dynamic effects may affect system performance is related to the effects of the geometric structure of the surface-confining magnetic fields on the shape and depth of the electron-generated internal negative potential well. Consider a magnetic field geometry, for example, in which the electron-reflecting field surfaces are planar in a cubical array. In this (unrealistic and undesirable) geometry injected electrons will never focus within the system and thus can never produce a negative potential well in the center of the cube. Rather, the potential well will tend to be uniform and the same everywhere, for electron injection with uniform current density over each surface. In contrast, electrons injected with uniform surface current density into a perfect spherical geometry will oscillate radially across the sphere, and will reach much higher density at the sphere center than at its surface. This will result in a deep central negative potential well which can confine ions in the system.

In the multi-faceted polyhedral magnetic field geometries of interest here for electron confinement, the degree to which the confining fields appear spherical or quasi-spherical to the electrons will depend upon the fineness of surface structue, and the time-averaged field strength and direction "seen" by electrons transiting (being reflected by) the field. An electron moving radially outward from the well center will encounter a field of increasing strength as it approaches the confinement volume boundary. Its energy of motion, and thus its radical speed will likewise increase as it "falls" back up the potential hill which has been created by its injection. By proper choice of a sufficiently large surface magnetic field strength, the radius of gyration of such electrons can be made small compared to the dimensions of the system, and the electrons will be "reflected" and returned to the system. The vector direction of their returned motion will depend upon the field angles seen by the electrons in or during the reflection/turning process.

Figure 12:
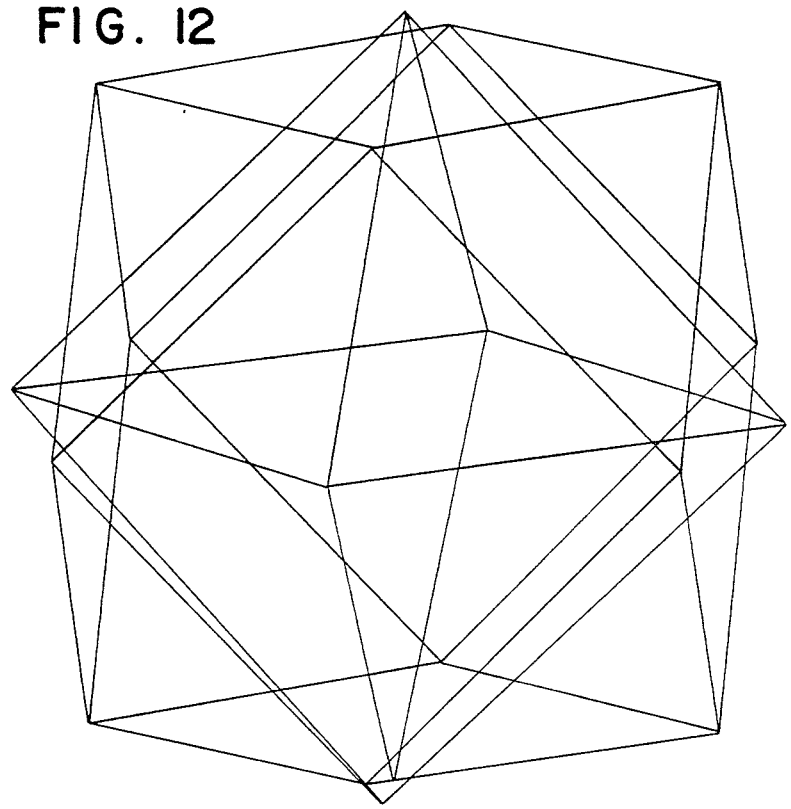
FIG. 12 is a diagram of a structure resulting from superposition of an octahedron and a truncated cube.

If the magnetic fields are maintained at constant levels (i.e., dc current driven, or fixed permanent magnets), the field strengths and angles will not change, and the reflected electrons will "scatter" off the field surfaces with a certain angular dispersion or spread. This spread will always result in a reduction of the well depth attainable in such a system as compared with that in a perfect spherical system. However, it is possible, in principle, to cause the fields to oscillate in such a manner that the electrons will perceive a time-averaged field direction which more nearly approximates a sphere, while still retaining the properties of MHD stability and low losses through point cusps. This can be done by utilizing two (or more) interlocking polyhedral geometries, and modulating the fields at a frequency sufficiently high that they oscillate through many cycles in one transit time of an electron. This is depicted in FIG. 12, which shows a structure resulting from the superposition or interlocking of an octahedral geometry with a truncated cube geometry. At such conditions, the electron will "see" the cycle-averaged field strength and direction of the interlocked polyhedral system; and this can be made to approximate a sphere quite closely.

This is the general approach used by Keller and Jones (mentioned above), who studied rf confinement and heating of neutral plasmas in an rf-modulated ocahedron interlocked with a truncated cube. In order to make this approach fully effective, the field vectors should have the same sign locally in each of the polyhedral structures as they proceed through each oscillation cycle, and their amplitudes interchange. Although this was not the case in the Keller and Jones work, they still observed spherical electric potential waves in their system.

Electrons at the confined volume surface region will be moving at maximum radial speed, hence will have a very short time for gyration/reflection in this region, given a field of sufficient strength, as required. To produce a quasi-spherical effective field for such electrons requires field driving modulation at a frequency higher than this gyration frequency. Conversely, near the center of the well where the magnetic field is small, the electrons possess and the electrons possess very small energy of motion, and are moving at relatively slow speed, hence the field oscillation frequency required for apparent quasi-sphericity is much lower than that required for electrons at the larger radii nearer the system surface/boundary. In effect, the frequency of modulation will set the radius region at which effective quasi-sphericity will become effective to enhance electron confinement.

As a final consideration, note that the degree of discreteness of even a constant strength (i.e. non-modulated) field structure seen by the electrons depends upon their radial position as well. Near the surface field-generating-coil region the local field strengths are large, and the topographical structure of the fields will follow that of the mechanical current-carrying structures which produce them. Deeper into the system, at smaller radii, the discreteness of structure becomes smoothed out, until even dc fields appear nearly-spherical at and around the center. The modulation of fields, the choice of frequency, and the interlocking polyhedra, as described above, are all controllable by design, and available to improve the confinement properties of the system.

Figure 13:
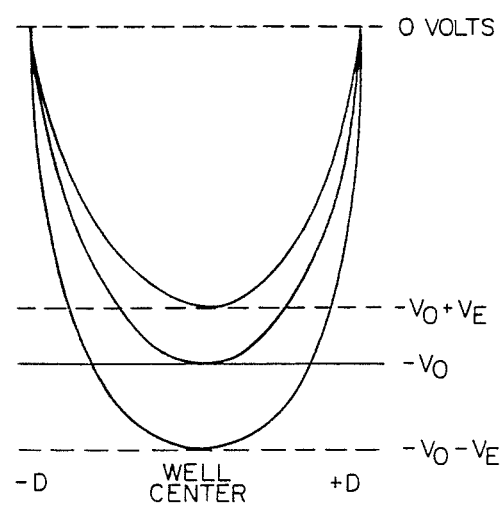
FIG. 13 is a graph illustrating the concept of periodic variation in the depth of the potential well as it might be practiced in conjunction with the present invention.

Also of potential interest is the possibility of modulating the electron (and/or ion) injection beams to produce a modulation of the internal potential well depth, and thus of ion confinement and reaction rate. FIG. 13 graphically illustrates the posibility of making the well depth oscillate. In the situation shown in FIG. 13, the well depth periodically varies between $-V_o+V_E$ and $-V_o-V_E$ with time. Thus, the variation can be expressed as $-(V_o+V_E)(\sin wt)$, where $w$ is the frequency of oscillation of the well depth.

The degree of modulation of the confining electrostatic potential well depth will depend upon the radial oscillatory current amplification (Gj). If this is large, a given modulation of input beam will yield only a small fluctuation in well depth, unless the modulation is locked to a transit time frequency of the particles oscillating in the well. With such resonant locking, it may prove possible to achieve large well fluctuations even with small modulation of input injection current. An eventual limit on this behavior will be set by the loss of coherence in beam/plasma resonance due to scattering in the transits of the beam after injection.

Conversely, if Gj is small, the well depth and reaction rate can be caused to fluctuate directly over a considerable range. Such modulation of reaction rate can also produce modulation of system electric radiative power output, both from plasma oscillations coupling within the central core region, and from the production of large oscillating potentials on surrounding or containing structures. Plasma core oscillations may also be stimulated by externally supplied radio frequency power through antennas radiating spherical rf waves into the plasma region. Such rf modulation (at injection beam frequencies, or harmonics thereof) may prove useful to enhance the oscillatory output of a system which is driven only by injection beam modulation. Any coupling of direct electrical power generated by the plasma into such rf wave structures would allow the device to function as a self-powered rf amplifier. These modes of operation are not necessary to the conception of the device as an invention in the art, but may be of interest as alternative or in addition to steady-state methods of operation.

The invention discussed herein offers the ability to create nuclear fusion reactions in a wide variety of fuels. As discussed above, these range from the least-tehcnically-demanding DT system, to the least complex and least costly DD system, to the radiation-free higher-Z fusion fuels (e.g. pB11, et al). Civil/commercial applications will favor the use of DD systems for the production of low-cost steam. Cheap steam can be used in conventional means for the generation of electricity, desalination of sea water, production of synthetic chemical fuels (e.g. alcohols, coal liquiefaction, etc.), chemical and materials processing, etc.

Some exemplary reactions which may be feasible with the present invention proceed as follows. First, D and T can be made to yield DT fusion reactions according to:

$$D+T \rightarrow He4\ (3.52\ Mev)+n\ (14.1\ Mev); \quad (1)$$
$$(Q=17.62\ Mev),$$

and confinement of D alone can be made to yield (with equal probability) DD fusion reactions as:

$$D+D \rightarrow He3\ (0.82\ Mev)+n\ (2.46\ Mev); \quad (2a)$$
$$(Q=3.28\ Mev)$$

$$D+D \rightarrow T\ (1.01\ Mev)+p\ (3.02\ Mev); \quad (2b)$$
$$(Q=4.03\ Mev)$$

The T produced (in Eq. 2b) will react according to Eq. (1) with the D in the plasma, if the fusion product tritons (T) are contained in the system. In general, in the systems considered, most of the energetic (Mev+) fusion products will escape the confined plasma volume. The He3 produced (in Eq. 2a) will also react, if confined, by:

$$D+He3 \rightarrow He4\ (3.67\ Mev)+p\ (14.7\ Mev);\ (Q=18.37\ Mev) \quad (3)$$

Other reactions of interest include:

$$p+Be9 \rightarrow He4\ (1.3\ Mev)+Li6\ (0.9\ Mev);\ (Q=2.2\ Mev) \quad (4a)$$

$$p+Li6 \rightarrow He3\ (2.3\ Mev)+He4\ (1.7\ Mev);\ (Q=4.0\ Mev) \quad (4b)$$

$$p+B11 \rightarrow 3\ He4;\ (Q=8.7\ Mev) \quad (4c)$$

It is useful to note that reactions (3) and (4a)—(4c) yield only charged particles as their fusion products. Thus they are radiation-free with respect to direct penetrating radiaton products (e.g. fast neutrons).

Table 2, below, summarizes the range of negative electric potential well depths required for the confinement of sufficient ions for useful reaction rates of the above reactions, for monoenergetic ions, and for equilibrium Maxwellian energy distributions.

TABLE 2

| NUCLEAR FUSION REACTIONS | RANGE OF NEGATIVE ELECTRIC POTENTIAL | |
|---|---|---|
| | NEGATIVE ELECTRIC POTENTIAL WELL DEPTH | |
| | Monoenergetic ions | Maxwellian ions |
| D + T | 15–100 kev | 10–200 kev |
| D + D | 30–200 kev | 20–400 kev |
| D + He3 | 50–350 kev | 30–600 kev |
| p + Be9; p + Li6 | 100 kev–700 kev | 60 kev–1.2 Mev |

TABLE 2-continued

| NUCLEAR FUSION REACTIONS | RANGE OF NEGATIVE ELECTRIC POTENTIAL | |
|---|---|---|
| | NEGATIVE ELECTRIC POTENTIAL WELL DEPTH | |
| | Monoenergetic ions | Maxwellian ions |
| p + B11 | 200 kev–1.4 Mev | 120 kev–2.4 Mev |

DD systems do not require the use of externally-supplied T, and thus do not require breeding blankets of Li (in which T is produced by n capture in Li6), as do closed-cycle DT systems. Systems operating on D alone will generate a significant output of neutrons at moderate energy (about 2.5 Mev; see Eq. 2a) in the DD fusion process. However, if the T produced in the DD reaction mix (see Eq. 2b) is not contained or burned within the plasma, no energetic 14 Mev neutrons will be produced and the radiaton hazard will be less tha (1/10) that of a DT system (see Eq. 1) for operation at the same gross fusion power level D (H2) is the least costly fusion fuel except for p (H1), which requires more expensive B11 or Li6 to generate radiation-free power. This fact and its relatively low radiation hazard potential make it a good candidate for use in civil/commercial/industrial profit-making energy plants.

In such energy plant use, it is contemplated that the fusion device willbe sufficiently small in size and low in cost that it can be operated to destruction or end-of-life without on-line maintenance, and may be removed, disposed of and replaced at such time. In this fashion, its in-plant application method resembles that of other compact fusion devices. See, for example, U.S. Pat. No. 4,367,193, issued to the present applicant. However, except for use of DT fel, no Li blankets are needed, and the fusion unit to be removed and replaced here need be only the magnetic coil system of the current invention, not necessarily including its ion and electron injectors. Such removal and replacement is not unique to fusion plants; similar exchange of power sources is made in jet aircraft whenever the turbojet engines reach their point of allowable wear or end-of-life, and to electric light bulbs which are replaced when they fail while the electric power plant supplying electricity to their sockets continues to operate.

As previously noted, DD fusion systems may produce energetic DT fusion neutrons (14.1 Mev) if the T produced in half of the DD fusion reactions (Eq. 2b) is captured and fed back into the plasma region to be burned. Since the DD process, in the invention discussed herein, does not require T for its startup or its continuation, no breeding of T is necessary for such DT reactions in a DD system. Thus all of these energetic neutrons, as well as all of those lower energy neutrons resulting from the other half (Eq. 2a) of the DD fusion process, are available to be used for the nuclear breeding of T or of fissionable fuels, or for the burnup of radioactive nuclear wastes. Thus, any DD-driven plant can also be designed to produce neutron-generated products as well. For example, a plant producing electricity might also use its output neutrons for the transmutation/burnup of fission product wastes from conventional nuclear reactors. It is estimated that DD systems which burn all of the T they produce will be capable of breeding 2–3 times as much transmuted product as is potentially possible in conventional fusion reactor plant concepts, and up to 20–50 times as much as from fission breeder reactors (e.g., Phenix-II of LMFBR).

Also as noted before, nuclear fusion reacting systems of the type herein will not generally confine the charged particle products of the reaction. These all appear with sufficient energy to escape the externally-driven ion-confining electrostatic potential well, and will not be confined by the magnetic fields used to support the electrons required for maintenance of this electrostatic well. They may be collected on the walls or on any other structure of the system outside the confined ion-plaasma region. Since they are charged particles this method of operation offers the prospect of the direct conversion of their energy to electricity, by the imposition of a high positive potential on these surronding walls/structures. Thus it is another object of this invention to allow the production of electrical energy by direct conversion of the energy of fusion product particles from their generation in devices of the type considered herein.

In DD systems the He3 and T produced can be collected and recycled back into the system for further fusion reaction and additional energy release with the D ions therein. Alternatively, the He3 and T products escaping the system could be collected and used as fusion fuel in DT or DHe3 fusion systems located elsewhere. Given a fusion system capable of burning DD, there appears little incentive to use DT fuels for civil/commercial applications. Conversely, burning high-neutron-output DT offers certain new and unique capabilities in military systems not previously attainable by any other means, and such systems seem especially useful for military applications.

Fusion by use of DT fuels can be accomplished in the system of the invention described herein with smaller central electric potentials than are needed for DD (or for any other fusionable fuels). Such DT fusion systems have the property that 80% of their output energy appears as 14.1 Mev neutrons. This highly radioactive neutron output makes then of potential use for various national defense missions, e.g. as small mobile ground-based radiation weapons, for remote irradiation of military targets with thermonuclear neutrons.

Their small size, low power consumption, and mobility also make such systems uniquely suited to a variety of military uses in the space environment. These include systems for remote inspace irradiation and radiation-counting inspection, radiation damage or kill of opposing spacecraft and equipment, etc. Calculations of neutron spectral output from such systems show that their spectral energy distribution is similar to that from relatively "clean" "hot" thermonuclear bombs, thus they could also be useful for some aspects of TN weapons output simulation.

The large output and low cost of the energetic neutrons which constitute the output of DT burning systems make these ideally economically suited for use as neutron sources for the breeding/production of a variety of nuclear fuels and other isotopes. These include reactor grade nuclear fuels (e.g., approximately 3.5% enriched in U233 or Pu239, etc.), weapons-grade fissionable material, low-cost T, and a variety of special trans-urani isotopes which have unique uses in nuclear weapons systems.

Finally, if negative potential well depths of 400–800 kev can be produced and maintained stably, as the current invention indicates, it is possible to burn non-radiative or radiation-free fusion fuels such as pB11 or pLi6, which yield only He4 and He3 as their fusion products. Although such special isotope fuels are more costly than DD alone, the radiation-free character of the systems in which they operate makes these of unique vale and application for various military and space missions. Among these are modulated self-powered microwave power generators with power output much larger than modulated input power; space propulsion engine systems for rocket propulsion at very high performance levels, exceeding conventional means by factors of 10–100; small, non-hazardous and light-weight space electric power systems; mobile military power plants; surface ship and submarine propulsion systems which do not require any significant shielding; and even radiation-free unshielded propulsion systems for aircraft. In any of these systems, the fusion products may be allowed to escape the confined plasma region and their energy may be converted directly to electricity, if desired.

In general, the large gain (G) of these systems, even at small sizes (see Table 1), makes their application to systems of modest size and scale quite straightforward. In fact, the smallest radiation-free systems could be used for a variety of civil applications on a local level; e.g., power units for apartment complexes, small housing developments, single manufacturing plants of modest size, etc. Other civil/commercial applications are obvious for radiation-free systems; including ship propulsion, prime power for railroad engines, and selected steam-generating and/or electric power production plants, where special isotope fuel costs are not significant compared to local costs of hazard prevention for radioactive fuels (especially DT).

In conclusion it is worth noting that the basic device, as conceived, is not necessarily an "ignition" device in which a certain set of conditions must be achieved in order that the fusion reactions will become self-sustaining. Rather it is inherently a power amplifier, in which (small) electric power is provided to the magnetic field coils and electron and ion injectors of the system, and (large) fusion reaction powers are induced and caused to continue steadily and stably within the machine's confined plasma volume. This feature is a natural result of the facts that: (a) electrons have gyro radii much smaller than the device radii; (b) fusion fuel ions have gyro radii comparable to the device radii, and; (c) fusion products have gyro radii much larger than the device radii. All of this ensures that: (a) electrons will be well-trapped by the magnetic fields of the device; (b) plasma ions will not be trapped by these fields but, rather, by the elctrostatic fields set up by the trapped electrons, and; (c) fusion product ions (e.g., He4, He3, T, etc.), with multi-Mev energies, will simply escape from the system entirely, carrying their energy with them. Because of this latter feature, the device may exhibit an "ignition-like" property, in which the initiation of significant fusion reactions can result in the ejection of large numbers of positive charges which, in turn, increase the fusion reaction rate by deepending the electrostatic well confining the fusion reactive plasma.

The richness and diversity of fuels and processes for fusion power production offered by this new and novel means of confinement and of adding energy to plasmas and charged particles offers many new possibilities for unique applications to conventional and non-convetional energy plants. In addition, entirely new types of energy/power systems for civil/commercial, space, and military uses are made possible by this device.

It will be apparent that the broad teachings of the present invention can be profitably applied to specific embodiments and applications far beyond what is set forth above for the purposes of illustration. The present invention should therefore not be in any way deemed limited to such specific embodiments and applications, but should instead be deemed fully commensurate in scope with the following claims.

What is claimed is:

1. A method of confining positively charged particles comprising the steps of:
   (a) generating a magnetic field within a region wherein all the cusps of said magnetic field are point cusps;
   (b) injecting electrons within said region and using said generated magnetic field to confine electrons within said region and so to generate a negative potential well; and
   (c) injecting positively charged particles within said region and using said negative potential well to confine said positively charged particles within said region; and
   (d) maintaining the number of electrons greater than the number of positively charged particles;
wherein said step (a) further comprises generating a surface cusp magnetic field having edge contours corresponding to a superposition of at least two truncated polyhedra.

2. A method of confining positively charged particles comprising the steps of:
   (a) generating a magnetic field within a region wherein all the cusps of said magnetic field are point cusps;
   (b) injecting electrons within said region and using said generated magnetic field to confine electrons within said region and so to generate a negative potential well; and
   (c) injecting positively charged particles within said region and using said negative potential well to confine said positively charged particles within said region; and
   (d) maintaining the number of electrons greater than the number of positively charged particles;
wherein said step (a) further comprises generating a surface cusp magnetic field having edge contours corresponding to a superposition of at least two polyhedra.

3. A method of confining positively charged particles comprising the steps of:
   (a) generating a magnetic field within a region wherein all the cusps of said magnetic field are point cusps;
   (b) injecting electrons within said region and using said generated magnetic field to confine electrons within said region and so to generate a negative potential well; and
   (c) injecting positively charged particles within said region and using said negative potential well to confine said positively charged particles within said region; and
   (d) maintaining the number of electrons greater than the number of positively charged particles;
wherein said step (a) further comprises generating a surface cusp magnetic field having edge contours corresponding to a superposition of at least a polyhedron and a truncated polyhedron.

4. An apparatus for controlling positively charged particles comprising:
   means for generating a magnetic field within a region, all the cusps of said magnetic field being point cusps;
   means for injecting electrons into the center of said region for forming a negative potential well within said region;
   means for injecting said positively charged particles into said negative potential well, said positively charged particles maintained within said region by said negative potential well; and
   means for maintaining the number of electrons greater than the number of positively charged particles;
   wherein said magnetic field generating means includes current carrying means for carrying an electric current, said current carrying means disposed on edges of one of an octahedron or a truncated regular polyhedron such that adjacent faces of said polyhedron have opposing magnetic polarities;
   wherein said magnetic field generating means generates only point cusps at positions corresponding to the centers of faces of said octahedron or truncated regular polyhedron; and
   wherein said electron injecting means is arranged to inject said electrons through one of said point cusps along a first line corresponding to an axis of said octahedron or truncated regular polyhedra.

5. An apparatus as claimed in claim 4 further comprising a second electron injection means arranged opposed to said first mentioned electron injection means across said magnetic field generating means.

6. An apparatus for controlling positively charged particles comprising:
   means for generating a magnetic field within a region, all the cusps of said magnetic field being point cusps;
   means for injecting electrons into the center of said region for forming a negative potential well within said region;
   means for injecting said positively charged particles into said negative potential well, said positively charged particles maintained within said region by said negative potential well; and
   means for maintaining the number of electrons greater than the number of positively charged particles;
   wherein said magnetic field generating means includes current carrying means for carrying an electric current, said current carrying means disposed on edges of one of an octahedron or a truncated regular polyhedron such that adjacent faces of said polyhedron have opposing magnetic polarities;
   wherein said magnetic field generating means generates only point cusps at positions corresponding to the centers of faces of said octahedron or truncated regular polyhedra; and
   wherein said electron injecting means is arranged to inject said electrons through one of said point cusps along a first line intersecting and axis of said octahedron truncated regular polyhedron at an angle.

7. An apparatus for controlling positively charged particles comprising:
   means for generating a magnetic field within a region, all the cusps of said magnetic field being point cusps;
   means for injecting electrons into the center of said region for forming a negative potential well within said region;
   means for injecting said positively charged particles into said negative potential well, said positively charged particles maintained within said region by said negative potential well; and means for maintaining the number of electrons greater than the number of positively charged particles;

wherein said magnetic field generating means includes current carrying means for carrying an electric current, said current carrying means disposed on edges of one of an octahedron or a truncated regular polyhedron such that adjacent face of said polyhedron have opposing magnetic polarities;

wherein said magnetic field generating means generates only point cusps at positions corresponding to the centers of faces of said octahedron or truncated regular polyhedron; and wherein said charged particle injecting means injects said particles in a beam along a line corresponding to an axis of said octahedron or truncated polyhedron.

8. An apparatus as claimed in claim 7 wherein said means for injecting electrons includes means for generating an electron beam with rotation.

9. An apparatus for controlling positively charged particles comprising:

means for generating a magnetic field within a region, all the cusps of said magnetic field being point cusps;

means for injecting electrons into the center of said region for forming a negative potential well within said region;

means for injecting said positively charged particles into said negative potential well, said positively charged particles maintained within said region by said negative potential well; and means for maintaining the number of electrons greater than the number of positively charged particles;

wherein said magnetic field generating means includes current carrying means for carrying an electric current, said current carrying means disposed on edges of one of an octahedron or a truncated regular polyhedron such that adjacent faces of said polyhedron have opposing magnetic polarities;

wherein said magnetic field generating means generates only point cusps at positions corresponding to the centers of faces of said octahedron or truncated regular polyhedron/ and wherein said charged particle injecting means is arranged to inject said charged particles through one of said point cusps.

10. An apparatus as claimed in claim 9 further comprising a second charged particle injection means arranged opposed to said first mentioned charged particle injection means across said magnetic field generating means.

11. An apparatus for controlling positively charged particles comprising:

means for generating a magnetic field within a region, all the cusps of said magnetic field being point cusps;

means for injecting electrons into the center of said region for forming a negative potential well within said region;

means for injecting said positively charged particles into said negative potential well, said positively charged particles maintained within said region by said negative potential well; and means for maintaining the number of electrons greater than the number of positively charged particles;

wherein said magnetic field generating means includes current carrying means for carrying an electric current, said current carrying means disposed on edges of one of an octahedron or a truncated regular polyhedron such that adjacent faces of said polyhedron have opposing magnetic polarities;

wherein said magnetic field generating means generates only point cusps at positions corresponding to the centers of faces of said octahedron or truncated regular polyhedron;

wherein said charged particles injecting means injects said particles in a beam along a line corresponding to an axis of said octahedron or truncated polyhedron; and wherein said injection means includes means for injecting said beam with rotation.

12. An apparatus for controlling positively charged particles comprising:

means for generating a magnetic field within a region, all the cusps of said magnetic field being point cusps;

means for injecting electrons into the center of said region for forming a negative potential well within said region;

means for injecting said positively charged particles into said negative potential well, said positively charged particles maintained within said region by said negative potential well; and means for maintaining the number of electrons greater than the number of positively charged particles;

wherein said magnetic field generating means includes current carrying means for carrying an electric current, said current carrying means disposed on edges of one of an octahedron or a truncated regular polyhedron such that adjacent faces of said polyhedron have opposing magnetic polarities;

wherein said magnetic field generating means generates only point cusps at positions corresponding to the centers of faces of said octahedron or truncated regular polyhedron; and wherein said charged particle injecting means is arranged to inject said charged particles along a second annulus through one of said point cusps, the central axis of said second annulus corresponding to an axis of said octahedron or truncated regular polyhedron.

13. An apparatus as claimed in claim 12 wherein said charged particles form an annular beam and said injection means includes means for injecting said beam with rotation.

14. An apparatus for controlling positively charged particles comprising:

means for generating a magnetic field within a region, all the cusps of said magnetic field being point cusps;

means for injecting electrons into the center of said region for forming a negative potential well within said region;

means for injecting said positively charged particles into said negative potential well, said positively charged particles maintained within said region by said negative potential well; and means for maintaining the number of electrons greater than the number of positively charged particles;

wherein said magnetic field generating means is further operable to generate a magnetic field conforming substantially in shape to a superposition of at least two polyhedra.

15. An apparatus as claimed in claim 14 wherein said current carrying means are disposed at positions corresponding to the edges of each polyhdedron.

16. An apparatus as in claim 15 wherein said current-carrying members are driven by alternating current supplies to produce 17. A device for producing collisional reactions comprising:
   (a) means for generating a magnetic field within a region, said means including magnetic field coils positioned on edges of a structure forming a polyhedral figure, each vertex of which is surrounded by an even number of faces, said field coils carrying currents such that adjacent faces of said polyhedral figure having opposing magnetic polarities,
   (b) means for injecting electrons within said region, said electrons having gyro radii effectively smaller than the radius of said region such that said electrons are trapped within said region by said magnetic field, said trapped electrons forming a negative potential well within a volum of said region;
   (c) means for injecting positively charged ions within said region, said ions having gyro radii effectively larger than a radius of said region, such that said positively charged ions are not trapped within said region by said magnetic field, said positively charged ions confined within said region by electric potential gradient forces resulting from said negative potential well, the number of electrons within said region maintained larger than the number of said positively charged ions, and said positively charged ions having energies sufficiently great within said region to produce collisional reactions.

18. A device as recited in claim 17 wherein said gyro radii of said electrons are on the order of 10–100 times smaller than a diameter of said region.

19. A device as recited in claim 17 wherein said gyro radii of said electrons are on the order of 0.5–5 mm at energies of about 20–50 kev in a magnetic filed of 1–5 kilogauss.

20. A device as recited in claim 17 wherein said collisional reactions are nuclear fusion reactions.

21. A device as recited in claim 17 wherein said ions are selected from isotopes of an element taken from the group consisting of lithium, beryllium, helium, boron and hydrogen.

22. A device as recited in claim 17 wherein said electrons are injected at energies producing a sufficiently large negative potential well so as to cause nuclear fusion reactions among said positively charged ions.

23. A device as recited in claim 17 wherein said volume of said negative potential well is free of any tangible structure.

24. A device as recited in claim 17 wherein said region is free of any tangible structure.

25. A device as recited in claim 17 further including means positioned outside of said region for converting energy resulting from said reactions into one of thermal and electrical energy.

26. A method for producing collisional reactions comprising the steps of:
   (a) generatiang a magnetic field within a region by passing current through magnetic field coils positioned on edges of a structure forming a polyhedral figure, each vertex of which is surrounded by an even number of faces, said currents such that adjacent faces of said polyhedral figure have opposing magnetic polarities,
   (b) injecting electrons within said region, said electrons having gyro radii effectively smaller than a radius of said region such that said electrons are trapped within said region by said magnetic field, said trapped electrons forming a negative potential well within a volume of said region; and
   (c) injecting positively charged ions within said region, said ions having gyro radii effectively larger than said radius of said region, such that said positively charged ions are not trapped within said region by said magnetic field, said positively charged ions confined within said region by electric potential gradient forces resulting from said negative potential well, the number of electrons within said region maintained larger than the number of said positively charged ions, and said positively charged ions having energies sufficiently great within said region to produce collisional reactions.

27. A method as recited in claim 26 wherein said gyro radii of said electrons are on the order of 10–100 times smaller than a diameter of said region.

28. A method as recited in claim 26 wherein said gyro radii of said electrons are on the order of 0.5–5 mm at energies of about 20–50 kev in a magnetic field of 1–5 kilogauss.

29. A method as recited in claim 26 wherein said collisional reactions are nuclear fusion reactions.

30. A method as recited in claim 21 wherein said ions are selected from isotopes of an element taken from the group consisting of lithium, beryllium, helium, boron and hydrogen.

31. A method as recited in claim 26 wherein said electrons are injected at energies producing a sufficiently large negative potential well so as to cause nuclear fusion reactions among said positively charged ions.

32. A method as recited in claim 26 wherein said volume of said negative potential well is free of any tangible structure.

33. A method as recited in claim 26 wherein said region is free of any tangible structure.

34. A method as recited in claim 26 further including the step of converting energy resulting from said reactions into one of thermal and electrical energy.

35. A method as recited in claim 26 further including the step of continuously increasing the number of electrons in said region to compensate for electron losses.

36. A method as recited in claim 26 further comprising the steps of periodically increasing the number of electrons in said region to compensate for electron losses.

* * * * *

UNITED STATES PATENT AND TRADEMARK OFFICE
CERTIFICATE OF CORRECTION

PATENT NO. : 4,826,646

DATED : May 2, 1989

INVENTOR(S) : Robert BUSSARD

It is certified that error appears in the above—identified patent and that said Letters Patent is hereby corrected as shown below:

On the title page: Item No. [73] delete "Inc.,".

On the title page: "Attorney, Agent or Firm" should read --Foley & Lardner, Schwartz, Jeffery, Schwaab, Mack, Blumenthal & Evans--.

Column 4, line 59, "(D or $H_2$)" should read --(D or $^2H$)--.

Column 4, line 59, "(T or $H_3$)" should read --(T or $^3H$)--.

Column 4, line 60, "(p or $H_1$)" should read --(p or $^1H$)--.

Column 13, line 8, after "of" insert --the--.

Column 15, line 4, "too" should read --to--.

Column 17, line 5, "detals" should read --details--.

Column 19, line 40, "$G_j=10E5$" should read --$G_j=1.0E5$--.

Column 20, line 33, "an" should read --any--.

Column 20, line 41, "$(n^2/B$" should read --$(n^2/B)$--.

Column 20, line 49, "ncessarily" should read --necessarily--.

Column 21, line 20, "radical" should read --radial--.

Column 22, line 3, delete "the" third occurence.

Column 22, line 4, delete "electrons" first occurence.

Column 22, line 4, delete "possess" first occurence.

Column 22, line 4, delete "and".

Column 22, line 36, "$-(Vo+V_E)$" should read --$(Vo)+(V_E)$--.

Column 23, line 5, "-tehcni-" should read -- -techni- --.

UNITED STATES PATENT AND TRADEMARK OFFICE
CERTIFICATE OF CORRECTION

PATENT NO. : 4,826,646
DATED : May 2, 1989
INVENTOR(S) : Robert BUSSARD

It is certified that error appears in the above—identified patent and that said Letters Patent is hereby corrected as shown below:

Column 23, line 13, "liquiefaction," should read
    --liquefacation--.
Column 24, line 18, "tha" should read --than--.
Column 24, line 34, "fel" should read --fuel--.
Column 24, line 68, "of" should read --or--.
Column 25, line 10, "ion-plaasma" should read
    --ion-plasma--.
Column 25, line 38, "then" should read --them--.
Column 25, line 61, "trans-urani" should read
    --trans-uranic--.
Column 26, line 2, "vale" should read --value--.
Column 26, line 49, "elctrostatic" should read
    --electrostatic--.
Column 31, line 13, after "produce" insert
    --oscillating magnetic fields.--.
Column 31, line 47, "filed" should read --field--.

UNITED STATES PATENT AND TRADEMARK OFFICE
CERTIFICATE OF CORRECTION

PATENT NO. : 4,826,646
DATED : May 2, 1989
INVENTOR(S) : Robert Bussard

It is certified that error appears in the above-identified patent and that said Letters Patent is hereby corrected as shown below:

Column 32, line 5, "generatiang" should read --generating--.
Column 32, line 41, "21" should read --26--.

Signed and Sealed this

Twenty-seventh Day of April, 1993

Attest:

MICHAEL K. KIRK

*Attesting Officer*    Acting Commissioner of Patents and Trademarks